(12) United States Patent
Tanimoto et al.

(10) Patent No.: US 7,981,958 B1
(45) Date of Patent: Jul. 19, 2011

(54) SYNTHETIC RESIN EMULSION POWDER

(75) Inventors: Seiji Tanimoto, Kurashiki (JP); Tetsuo Murakami, Kurashiki (JP); Masato Nakamae, Osaka (JP); Naoki Fujiwara, Kurashiki (JP)

(73) Assignee: Kuraray Co., Ltd., Kurashiki (JP)

( * ) Notice: Subject to any disclaimer, the term of this patent is extended or adjusted under 35 U.S.C. 154(b) by 942 days.

(21) Appl. No.: 10/653,056

(22) Filed: Sep. 3, 2003

(30) Foreign Application Priority Data

Sep. 17, 2002 (JP) ................................. 2002-269600
Sep. 17, 2002 (JP) ................................. 2002-269602
Dec. 16, 2002 (JP) ................................. 2002-363724

(51) Int. Cl.
 *C08J 3/12* (2006.01)
(52) U.S. Cl. ......................... 524/459; 524/557; 526/202
(58) Field of Classification Search .................. 524/459, 524/557; 526/202
 See application file for complete search history.

(56) References Cited

U.S. PATENT DOCUMENTS

| | | | |
|---|---|---|---|
| 4,565,854 A | | 1/1986 | Sato et al. |
| 5,599,870 A * | | 2/1997 | Nakamae et al. ............ 524/503 |
| 5,900,463 A | | 5/1999 | Tanimoto et al. |
| 6,001,903 A * | | 12/1999 | Nakamae et al. ............... 524/3 |
| 6,300,403 B1 * | | 10/2001 | Mayer et al. .................. 524/459 |
| 6,451,898 B1 | | 9/2002 | Tanimoto et al. |
| 6,495,623 B1 | | 12/2002 | Tanimoto et al. |
| 6,576,698 B1 * | | 6/2003 | Weitzel .......................... 524/459 |
| 6,605,663 B1 * | | 8/2003 | Weitzel .......................... 524/459 |
| 6,635,709 B2 | | 10/2003 | Kato et al. |
| 2001/0025078 A1 * | | 9/2001 | Mayer et al. .................. 524/459 |

FOREIGN PATENT DOCUMENTS

| | | |
|---|---|---|
| EP | 0 765 885 | 4/1997 |
| EP | 1 038 903 | 9/2000 |
| EP | 1065224 A1 * | 1/2001 |
| EP | 1110978 A1 * | 6/2001 |
| JP | 11-263849 | 9/1999 |
| JP | 2000342260 A * | 12/2000 |
| JP | 2001-342260 | 12/2001 |
| WO | WO 9916794 A1 * | 4/1999 |

OTHER PUBLICATIONS

English Translation to Mayer, WO 99/16794) (1999).*
English Translation to Weitzel (EP 1110978) (2001).*
English Translation to Weitzel (EP 1065224) (2001).*
S. Tanimoto, et al., Database CA 'Online', AN 136: 38246, XP-002262485, 1 page, "Antiblocking Redispersible Synthetic Resin Emulsion Powder and Manufacturing Methods Therefor", JP 2001-342260, Dec. 11, 2001.

* cited by examiner

*Primary Examiner* — Kelechi C Egwim
(74) *Attorney, Agent, or Firm* — Oblon, Spivak, McClelland, Maier & Neustadt, L.L.P.

(57) ABSTRACT

Disclosed is a synthetic resin emulsion powder obtained by spray-drying a composition that comprises an emulsion (A) where the dispersoid is a polymer that having one or more unsaturated monomer units selected from ethylenic unsaturated monomers and dienic monomers, and a polyvinyl alcohol (B) having, in the molecule, from 1 to 12 mol % of ethylene units. The emulsion powder has good redispersibility and good water resistance. Its redispersion well form good films and has good storage stability at low temperatures. The emulsion powder is favorable for additives to hydraulic substances, as it well disperses in hydraulic substances such as cement mortar and gives hardened articles of high mechanical strength. The emulsion powder is also favorable for joint materials for hydraulic substances, as its adhesiveness and durability are both good and gives jointed articles of high mechanical strength.

44 Claims, No Drawings

SYNTHETIC RESIN EMULSION POWDER

BACKGROUND OF THE INVENTION

1. Field of the Invention

The present invention relates to synthetic resin emulsion powder. More precisely, the invention relates to synthetic resin emulsion powder obtained by spray-drying a composition that comprises an emulsion (A) where the dispersoid is a polymer having one or more unsaturated monomer units selected from ethylenic unsaturated monomers and dienic monomers, and a polyvinyl alcohol (B) having an ethylene unit content of from 1 to 12 mol %.

2. Description of the Related Art

Synthetic resin emulsion powder is produced by spray-drying a synthetic resin emulsion, and is superior to the starting emulsion thereof in point of the processability and the transportability as it is powdery. Before use, water may be added to the powder and stirred, whereby the powder may readily redisperse in water. Accordingly, the powder is much used in various applications for additives to cement and mortar, adhesives, binders for coating compositions, etc. In particular, since the powder can be premixed with mortar to realize various modifications of commercial products, and it is especially favorable for additives to mortar and is therefor widely used in the art. However, when conventional synthetic resin emulsions are directly spray-dried, then the dispersoid particles therein may readily fuse together and could not redisperse in water. At present, therefore, a large amount of polyvinyl alcohol must be added later to the emulsions, or a large amount of inorganic powder such as silicic anhydride that serves as an antiblocking agent must be in the emulsions to solve the problem. For the polyvinyl alcohol that is added later to the emulsions, partially saponified (hydrolyzed) PVA has heretofore been widely used (see JP-A 11-263849, claim 1 and paragraphs [0011] and [0012]) since it must be powdered and must be re-emulsified before use. However, as will be obvious from Comparative Examples 7 and 8 given hereinunder, the redispersibility of the PVA powder is not always good, and, in addition, another problem with the PVA powder is that the water resistance of the emulsion obtained through redispersion of the emulsion powder is inferior to that of the original emulsion.

Also known is a powder for that purpose, that is obtained by spray-drying an emulsion with a mercapto-terminated polyvinyl alcohol serving as a dispersant (see JP-A 9-151221, claim 1 and paragraphs [0011] and [0020]). Further known is a powder that is obtained by spray-drying an emulsion with a 1,2-glycol bond-rich PVA which is prepared through high-temperature polymerization and serves as a dispersant (see JP-A 2001-342260, claim 1). The redispersibility of these synthetic resin emulsion powders is good, as is apparent from Comparative Examples 26 to 27 given hereinunder, but is not still satisfactory. For example, when the powders are used as additives to cement mortar, the mechanical strength of the resulting cement mortar is not always satisfactory.

SUMMARY OF THE INVENTION

An object of the invention is to solve the problems as above and to provide synthetic resin emulsion powder of good redispersibility and water resistance, of which the redispersion has good film formability and storage stability at low temperatures.

Another object of the invention is to provide synthetic resin emulsion powder which, when used as an additive to hydraulic substances or as a joint material for them, gives hardened constructions of high strength.

The above-mentioned objects are attained by providing a synthetic resin emulsion powder which is obtained by drying a composition that comprises an emulsion (A) where the dispersoid is a polymer having one or more unsaturated monomer units selected from ethylenic unsaturated monomers and dienic monomers, and a polyvinyl alcohol (B) having an ethylene unit content of from 1 to 12 mol %.

Preferably, the objects are attained by providing a synthetic resin emulsion powder obtained by drying a composition that comprises an emulsion (A) where the dispersant is a polyvinyl alcohol and the dispersoid is a polymer having one or more unsaturated monomer units selected from ethylenic unsaturated monomers and dienic monomers, and a polyvinyl alcohol (B) having an ethylene unit content of from 1 to 12 mol % added thereto.

Also preferably, the objects are attained by providing a synthetic resin emulsion powder which is obtained by spray-drying an emulsion (A) where the dispersant is a polyvinyl alcohol (B) having an ethylene unit content of from 1 to 12 mol % and the dispersoid is a polymer having one or more unsaturated monomer units selected from ethylenic unsaturated monomers and dienic monomers.

DESCRIPTION OF THE PREFERRED EMBODIMENTS

The synthetic resin emulsion powder of the invention is described in detail hereinunder.

In the invention, the dispersoid of the emulsion (A) comprises a polymer having one or more unsaturated monomer units selected from ethylenic unsaturated monomers and dienic monomers. The ethylenic unsaturated monomers include, for example, olefins such as ethylene, propylene, isobutene; halogeno-olefins such as vinyl chloride, vinylidene chloride, vinyl fluoride, vinylidene fluoride; vinyl esters such as vinyl formate, vinyl acetate, vinyl propionate, vinyl versatate, vinyl pivalate; acrylic acid and acrylates such as methyl acrylate, ethyl acrylat, n-propyl acrylate, i-propyl acrylate, n-butyl acrylate, i-butyl acrylate, t-butyl acrylate, 2-ethylhexyl acrylate, dodecyl acrylate, octadecyl acrylate; methacrylic acid and methacrylates such as methyl methacrylate, ethyl methacrylate, n-propyl methacrylate, i-propyl methacrylate, n-butyl methacrylate, i-butyl methacrylate, t-butyl methacrylate, 2-ethylhexylmethacrylate, dodecylmethacrylate, octadecyl methacrylate; nitriles such as acrylonitrile, methacrylonitrile; allyl compounds such as allyl acetate, allyl chloride; styrene monomers such as styrene, α-methylstyrene, p-methylstyrenesulfonic acid and its sodium and potassium salts; trimethyl(3-acrylamido-3-dimethylpropyl)ammonium chloride, 3-acrylamidopropyltrimethylammonium chloride, 3-methacrylamidopropyltrimethylammonium chloride, N-(3-allyloxy-2-hydroxypropyl)dimethylamine quaternary ammonium salt, N-(4-allyloxy-3-hydroxybutyl)diethylamine quaternary ammonium salt, as well as quaternary ammonium salts of acrylamide, N-methylacrylamide, N-ethylacrylamide, N,N-dimethylacrylamide, diacetonacrylamide, N-methylolacrylamide, methacrylamide, N-methylmethacrylamide, N-ethylmethacrylamide, N-methylolmethacrylamide; and hydroxypropyltrimethylammonium chloride methacrylate, hydroxypropyltrimethylammonium chloride acrylate, N-vinylpyrrolidone. The dienic monomers include, for example, butadiene, isoprene, chloroprene. One or more of these monomers may be used herein either singly or as combined.

Of the polymers that comprise any of the above-mentioned monomer units, preferred for use in the invention are polyvinyl esters such as typically polyvinyl acetate, and olefin-vinyl ester copolymers such as typically ethylene-vinyl acetate copolymer.

The polyvinyl alcohol (B) having an ethylene unit content of from 1 to 12 mol % for use in the invention may be obtained through saponification of a copolymer of a vinyl ester and ethylene. It is a matter of importance that the ethylene unit content of the polyvinyl alcohol (B) is from 1 to 12 mol % in one molecule. Preferably, the ethylene unit content is at least 1.5 mol %, more preferably at least 2 mol %. If the ethylene unit content is lower than the range, the redispersibility of the emulsion powder is not good, as is obvious from Comparative Example 5 given hereinunder; but if higher than the range, the redispersibility of the emulsion powder is extremely bad and the film formability thereof is also bad, as is obvious from Comparative Example 6 and Comparative Example 9 given hereinunder.

One preferred embodiment of the polyvinyl alcohol (B) that has an ethylene unit content of from 1 to 12 mol % for use in the invention has a 1,2-glycol bond content of from (1.7-X/40) to 4 mol % in which X (mol %) indicates the ethylene unit content of the polymer. Using the polymer of the preferred type further improves the redispersibility of the emulsion powder obtained herein.

For producing the polymer of the type, for example, employable is a method of copolymerizing vinylene carbonate with a vinyl ester monomer and ethylene in such a controlled manner that the 1,2-glycol bond content of the resulting copolymer could fall within the range as above; or a method of copolymerizing ethylene and a vinyl ester monomer under pressure in such a controlled manner that the polymerization temperature is kept higher than usual, for example, falling between 75 and 200° C. Though not specifically defined, the polymerization temperature in the latter method preferably falls between 95 and 190° C., more preferably between 100 and 160° C.

In this case, the 1,2-glycol bond content is preferably at least (1.7-X/40) mol %, more preferably at least (1.75-X/40), most preferably at least (1.8-X/40). Also preferably, the 1,2-glycol bond content is at most 4 mol %, more preferably at most 3.5 mol %, most preferably at most 3.2 mol %. The 1,2-glycol bond content of the polymer may be obtained through NMR spectral analysis thereof.

Not interfering with the advantages of the invention, the polyvinyl alcohol (B) may be a copolymer with any copolymerizable ethylenic unsaturated monomer. The ethylenic unsaturated comonomer inclues, for example, acrylic acid, methacrylic acid, fumaric acid, maelic acid (anhydride), itaconic acid, acrylonitrile, methacrylonitrile, acrylamide, aethacrylamide, trimethyl-(3-acrylamide-3-dimethylpropyl)-ammonium chloride, acrylamido-2-methylpropanesulfonic acid and its sodium salt, ethyl vinyl ether, butyl vinyl ether, vinyl chloride, cinyl bromide, vinyl fluoride, vinylidene chloride, vinylidene fluoride, tetrafluoroethylene, sodium vinylsulfonate, sodium allylsulfonate, N-vinylpyrrolidone, as well as N-vinylamides such as N-vinylformamide, N-vinylacetamide. Though not specifically defined, the amount of the copolymerizable monomer may be generally at most 5 mol %.

The amount of the polyvinyl alcohol (B) to be in the composition is preferably at least 1 parts by weight and also at most 50 parts by weight, relative to 100 parts by weight of the solid content (dispersoid) of the synthetic resin emulsion (A) therein. If the amount of the polyvinyl alcohol (B) is smaller than 1 part by weight, the redispersibility of the powdered emulsion may be poor, and, in addition, the mechanical stability of the emulsion powder added to a hydraulic substance may be poor and the dispersibility of the emulsion powder in a hydraulic substance may also be poor. If, however, the amount is larger than 50 parts by weight, then the physical properties such as the water resistance of the emulsion powder obtained may be poor and, in addition, the strength of the hydraulic substance that contains the emulsion powder may lower.

Next described is an embodiment of the invention, a synthetic resin emulsion that is obtained by adding a polyvinyl alcohol (B) having from 1 to 12 mol % of ethylene units in the molecule to an emulsion (A) of which the dispersoid is a polymer having one or more unsaturated monomer units selected from ethylenic unsaturated monomers and dienic monomers.

The dispersant for the emulsion (A) is preferably a polyvinyl alcohol. The polyvinyl alcohol is, for example, any of an ordinary polyvinyl alcohol that is produced through saponification of a polyvinyl ester obtained by polymerizing a vinyl ester; a polyvinyl alcohol having a 1,2-glycol bond content of at least 1.9 mol % that will be described hereinunder; or the above-mentioned polyvinyl alcohol (B). Of those, preferred is a polyvinyl alcohol having a 1,2-glycol bond content of at least 1.9 mol % as it betters the redispersibility of the synthetic resin powder containing it and improves the water resistance and the mechanical strength of the hydraulic substance containing it.

Though not specifically defined, the saponification degree of the polyvinyl alcohol to be used herein for the dispersant in the emulsion (A) is preferably from 70 to 99 mol %, more preferably from 80 to 98 mol %, even more preferably from 83 to 95 mol %. If the saponification degree thereof is lower than 70 mol %, the solubility in water of the polyvinyl alcohol that is intrinsic thereto may lower. If, however, the saponification degree thereof is higher than 99 mol %, the emulsion polymerization to give the polymer may be unstable. Also though not specifically defined, the viscosity-average degree of polymerization (hereinafter this will be abbreviated as the degree of polymerization) of the polyvinyl alcohol is preferably from 100 to 8000, more preferably from 300 to 3000, most preferably from 300 to 2500.

Not detracting from the advantages of the invention, the polyvinyl alcohol may be copolymerized with any other ethylenic unsaturated monomer, for example, as in the above-mentioned polyvinyl alcohol (B).

The synthetic resin emulsion (A) for use in the invention may be obtained through emulsion polymerization of one or more monomers selected from ethylenic unsaturated monomers and dienic monomers in the presence of the above-mentioned polyvinyl alcohol. In producing the synthetic resin emulsion, the initiator for the emulsion polymerization may be any ordinary polymerization initiator generally used in ordinary emulsion polymerization, for example, water-soluble initiators such as potassium persulfate, ammonium persulfate, hydrogen peroxide, t-butyl hydroperoxide; oil-soluble initiators such as azobisisobutyronitrile, benzoyl peroxide. These may be used either singly or as a redox system combined with some reducing agent. The method of using it is not specifically defined. For example, it may be added to the polymerization system all at a time in the initial stage, or may be continuously added thereto.

In the synthetic resin emulsion (A) for use in the invention, the amount of the polyvinyl alcohol is not specifically defined. In general, it may be from 2 to 30 parts by weight, preferably from 3 to 15 parts by weight, more preferably 3 to 10 parts, relative to 100 parts by weight of the dispersoid, that is, the monomer to be polymerized in the presence of it.

The mode of adding the polyvinyl alcohol to the system is not also specifically defined. It may be added thereto all at a time in the initial stage, or a part of it is added thereto in the initial stage and the remaining part thereof may be continuously added thereto during the polymerization.

Regarding the addition of the monomer in producing the synthetic resin emulsion (A) for use in the invention, employable are various methods. For example, the monomer may be added to the polymerization system all at a time in the initial stage; or a part of the monomer may be added thereto in the initial stage and the remaining part thereof may be continuously added thereto during the polymerization; or the monomer is previously emulsified with water along with a dispersant and the resulting emulsion may be continuously added to the polymerization system.

If desired, a chain transfer agent may be added to the system in producing the synthetic resin emulsion (A) for use in the invention. Not specifically defined, the chain transfer agent may be any and every one that causes chain transfer in polymer. In view of the efficiency in chain transfer with it, preferred for use herein are mercapto group-having compounds. The mercapto group-having compounds are, for example, alkylmercaptans such as n-octylmercaptan, n-dodecylmercaptan, t-dodecylmercaptan; and 2-mercaptoethanol, 3-mercaptopropionic acid.

The amount of the chain transfer agent to be added to the system is preferably at most 5 parts by weight relative to 100 parts by weight of the monomer. If the amount of the chain transfer agent added is over 5 parts by weight, the polymerization stability of the synthetic resin emulsion produced will be poor and, in addition, the molecular weight of the polymer to form the dispersoid may greatly lower and, as a result, the physical properties of the emulsion may be thereby worsened.

Thus obtained, the polyvinyl alcohol (B) is added to the emulsion (A) to obtain the synthetic resin emulsion for use in the invention.

For adding the polyvinyl alcohol (B) to the emulsion (A), for example, one preferred method comprises adding an aqueous solution of polyvinyl alcohol (B) to emulsion (A). Apart from it, also employable is a method of adding a powder, flakes or pellets of the polyvinyl alcohol (B) to the emulsion (A). Still another method employable for it comprises adding the polyvinyl alcohol (B) to the emulsion (A) being prepared through emulsion polymerization, all at a time or continuously, in the latter stage of emulsion polymerization to give the emulsion (A).

The degree of polymerization of the polyvinyl alcohol (B) to be added to the emulsion (A) may be determined in consideration of various conditions, not specifically defined. For easy operation to powder the emulsion, in general, it may be preferably from 100 to 3000, more preferably from 150 to 2000, even more preferably from 200 to 1600, most preferably from 200 to 1000. On the other hand, the saponification degree of the polyvinyl alcohol (B) is not also specifically defined, but is preferably from 70 to 99 mol %, more preferably from 75 to 98 mol %, even more preferably from 80 to 96 mol %.

The amount of the polyvinyl alcohol (B) to be added to 100 parts by weight of the solid content of the emulsion (A) is preferably from 1 to 50 parts by weight, more preferably from 3 to 30 parts by weight, even more preferably from 5 to 30 parts by weight, most preferably from 7 to 20 parts by weight.

Next described is another embodiment of the invention for obtaining an emulsion (A) in which the dispersant is a polyvinyl alcohol (B) having an ethylene unit content of from 1 to 12 mol % and the dispersoid is a polymer that contains one or more unsaturated monomer units selected from ethylenic unsaturated monomers and dienic monomers.

In this embodiment, the emulsion (A) may be obtained through emulsion polymerization of one or more monomers selected from ethylenic unsaturated monomers and dienic monomers, in the presence of a polyvinyl alcohol (B) having an ethylene unit content of from 1 to 12 mol % in the molecule, and the condition for producing it may be the same as that for the above-mentioned emulsion (A).

The amount of the dispersant, polyvinyl alcohol (B) may be preferably from 2 to 30 parts by weight, more preferably from 3 to 15 parts by weight, most preferably from 3 to 10 parts by weight, relative to 100 parts by weight of the dispersoid.

The viscosity-average degree of polymerization (hereinafter this will be abbreviated as the degree of polymerization) of the polyvinyl alcohol (B) for the dispersant may be determined in consideration of various conditions and is not specifically defined. However, in view of the workability thereof in powdering the emulsion, the degree of polymerization of the polyvinyl alcohol (B) is preferably from 100 to 8000, more preferably from 300 to 3000, most preferably from 300 to 2500. On the other hand, the saponification degree of the polyvinyl alcohol (B) is not also specifically defined, but is preferably from 70 to 99 mol %, more preferably from 80 to 98 mol %, even more preferably from 83 to 95 mol %.

The mode of adding the dispersant, polyvinyl alcohol (B) to the system is not specifically defined. For example, it may be added thereto all at a time in the initial stage of polymerization; or a part of the polyvinyl alcohol (B) may be added to the system in the initial stage of polymerization and the remaining part thereof may be continuously added thereto during the polymerization.

If desired, any known nonionic, anionic, cationic or ampholytic surfactant or water-soluble polymer such as hydroxyethyl cellulose may be used along with the polyvinyl alcohol.

Adding a polyvinyl alcohol (C) to the thus-obtained emulsion (A) with the polyvinyl alcohol (B) serving as the dispersant therein is one preferred embodiment of the invention. The polyvinyl alcohol (C) includes, for example, ordinary polyvinyl alcohol such as that mentioned hereinabove, the polyvinyl alcohol having a 1,2-glycol bond content of at least 1.9 mol % to be mentioned hereinunder, and the above-mentioned polyvinyl alcohol (B).

The degree of polymerization of the polyvinyl alcohol (C) may be determined in accordance with various conditions and is not specifically defined. However, in view of the workability thereof in powdering the emulsion, the degree of polymerization of the polyvinyl alcohol (C) is preferably from 100 to 3000, more preferably from 150 to 2000, even more preferably from 200 to 1600, most preferably from 200 to 1000. On the other hand, the saponification degree of the polyvinyl alcohol (C) is not also specifically defined, but is preferably from 70 to 99 mol %, more preferably from 75 to 98 mol %, even more preferably from 80 to 96 mol %.

The amount of the polyvinyl alcohol (C) to be added to the emulsion (A) may be from 1 to 50 parts by weight, preferably from 3 to 30 parts by weight, even more preferably from 5 to 20 parts by weight, most preferably from 7 to 20 parts by weight, relative to 100 parts by weight of the solid content (dispersoid) of the emulsion (A).

Using a synthetic resin emulsion that is prepared by adding a polyvinyl alcohol (D) having a 1,2-glycol bond content of at least 1.9 mol % to the emulsion (A) in which the dispersant is a polyvinyl alcohol and the dispersoid is a polymer having one or more unsaturated monomer units selected from ethylenic unsaturated monomers and dienic monomers is also a preferred embodiment of the invention.

This embodiment is described below.

In this, the emulsion (A) may be the same as that mentioned hereinabove.

It is a matter of importance that the 1,2-glycol bond content of the polyvinyl alcohol (D) to be added to the emulsion (A) is at least 1.9 mol %, more preferably at least 1.95 mol %, even more preferably at least 2.0 mol %, most preferably at least 2.1 mol %. Adding the polyvinyl alcohol (D) of the type to the emulsion (A) improves the redispersibility of the emulsion powder and, in addition, when the emulsion powder is used for additives or construction joints for hydraulic substances such as cement or cement mortar, it improves the physical properties such as the bending strength of the hydraulic substances. Preferably, the 1,2-glycol bond content of the polyvinyl alcohol (D) is at most 4 mol %, more preferably at most 3.5 mol %, most preferably at most 3.2 mol %. The 1,2-glycol bond content of the polymer may be obtained through NMR spectral analysis of the polymer.

The method of producing the polyvinyl alcohol (D) having a 1,2-glycol bond content of at least 1.9 mol % is not specifically defined, and may be any known one. For producing the polymer of the type, for example, employable is a method of copolymerizing vinylene carbonate with a vinyl ester monomer in such a controlled manner that the 1,2-glycol bond content of the resulting copolymer could fall within the range as above; or a method of polymerizing a vinyl ester under pressure in such a controlled manner that the polymerization temperature is kept higher than usual, for example, falling between 75 and 200° C. The polymerization temperature in the latter method preferably falls between 95 and 190° C., more preferably between 100 and 180° C. It is important that the condition for pressure is so selected that the polymerization system could be kept at a temperature not higher than the boiling point thereof. Preferably, the pressure may be at least 0.2 MPa, more preferably at least 0.3 MPa. The uppermost limit of the pressure is preferably at most 5 MPa, more preferably at most 3 MPa. The polymerization may be effected in any mode of bulk polymerization, solution polymerization, suspension polymerization, emulsion polymerization or the like, in the presence of a radical polymerization initiator. In particular, preferred is solution polymerization especially in a solvent of methanol. Thus prepared, the polyvinyl ester may be subjected to saponification in any ordinary manner to give the polyvinyl alcohol for use herein.

The degree of polymerization of the polyvinyl alcohol (D) may be determined in accordance with various conditions and is not specifically defined. However, in view of the workability thereof in powdering the emulsion, in general the degree of polymerization of the polyvinyl alcohol (D) is preferably from 100 to 3000, more preferably from 150 to 2000, even more preferably from 200 to 1600, most preferably from 200 to 1000. On the other hand, the saponification degree of the polyvinyl alcohol (D) is not also specifically defined, but is preferably from 70 to 99 mol %, more preferably from 75 to 98 mol %, even more preferably from 80 to 96 mol %.

Not detracting from the advantages of the invention, the polyvinyl alcohol (D) may be copolymerized with any ethylenic unsaturated monomer such as that as in the above-mentioned polyvinyl alcohol (B).

The amount of the polyvinyl alcohol (D) to be added to the synthetic resin emulsion (A) may be preferably from 1 to 50 parts by weight, more preferably from 3 to 30 parts by weight, even more preferably from 5 to 20 parts by weight, most preferably from 7 to 20 parts by weight, relative to 100 parts by weight of the solid content (dispersoid) of the emulsion (A). Adding the polyvinyl alcohol (D) of the type to the emulsion (A) improves the redispersibility of the emulsion powder that is obtained after drying the emulsion, and, in addition, it also improves the dispersibility of the emulsion powder in hydraulic substances whereby the strength of the hydraulic substances with the emulsion powder therein may be thereby increased.

The synthetic resin emulsion powder of the invention may be obtained by drying the synthetic resin emulsion that has been obtained according to the method mentioned hereinabove, preferably by spray-drying it. Spray-drying the emulsion may be effected in any ordinary manner of spraying and drying a liquid. Regarding the spraying mode for it, the emulsion may be sprayed with any of discs, nozzles or shock waves. For the heat source, employable is any of hot air or hot steam. The drying condition may be suitably determined depending on the size and the type of the spraying drier used, and on the concentration, the viscosity and the flow rate of the synthetic resin emulsion to be spray-dried. The drying temperature range suitably falls between 100° C. and 150° C., within which it is desirable that the other drying conditions are determined so as to obtain well dried powder.

For improving the storage stability and the redispersibility in water of the synthetic resin emulsion powder of the invention, it is desirable to add inorganic powder (antiblocking agent) to the emulsion powder. The inorganic powder may be added to the spray-dried emulsion powder and uniformly mixed with it. However, it is desirable that the synthetic resin emulsion is sprayed in the presence of an inorganic powder (simultaneous spraying of emulsion along with inorganic powder) for more uniformly mixing them. Preferably, the inorganic powder is a particle powder having a mean particle size of from 0.1 to 100 μm. For the inorganic powder, preferred is a powder of fine particles, for which, for example, usable are calcium carbonate, clay, silicic anhydride, aluminium silicate, white carbon, talc, and alumina white. Of those inorganic powders, more preferred is silicic anhydride. The amount of the inorganic powder is preferably at most 20% by weight, more preferably at most 10% by weight, in view of its properties. The lowermost limit of the amount is preferably at least 0.1% by weight, more preferably at least 0.2% by weight. Organic fillers may also be used for the powder.

For further improving the redispersibility in water of the synthetic resin emulsion powder, various water-soluble additives may be added to the powder. Preferably, the additive is added to the synthetic resin emulsion before the emulsion is spray-dried, as it may be uniformly mixed with the resulting emulsion powder. The amount of the water-soluble additive to be added is not specifically defined and may be suitably so controlled that it does not have any negative influence on the physical properties such as water resistance of the emulsion. The additives include, for example, hydroxyethyl cellulose, methyl cellulose, starch derivatives, polyvinylpyrrolidone, polyethylene oxide, as well as water-soluble alkyd resins, water-soluble phenolic resins, water-soluble urea resins, water-soluble melamine resins, water-soluble naphthalenesulfonic acid resins, water-soluble amino resins, water-soluble polyamide resins, water-soluble acrylic resins, water-soluble polycarboxylic acid resins, water-soluble polyester resins, water-soluble polyurethane resins, water-soluble polyol resins, water-soluble epoxy resins.

The synthetic resin emulsion powder of the invention (having a mean particle size of from 1 to 1000 μm, preferably from 2 to 500 μm) may be directly used for various application as it is, but if desired, it may be combined with any other conventional known emulsion or emulsion powder not detracting from the advantages of the invention.

The synthetic resin emulsion powder of the invention is especially useful for additives to hydraulic substances or for joint materials for hydraulic substances. The hydraulic substances as referred to herein include, for example, hydraulic cement such as Portland cement, alumina cement, slag cement, fly ash cement; and other hydraulic materials than cement, such as gypsum and plaster.

In case where the additive to such hydraulic substances is added, for example, to cement mortar that comprises cement, aggregate and water, its amount is preferably from 5 to 20% by weight of cement. The aggregate may be any of fine aggregate such as river sand, ground sand, color sand and siliceous sand; and coarse aggregate such as river gravel and ground stones.

In case where the synthetic resin emulsion powder of the invention is used for a joint material for hydraulic substances, the powder is suitably re-emulsfied in water and applied onto a hydraulic substance substrate of concrete or the like to be a joint material (primer-processing agent) for it, and then a hydraulic substance such as cement mortar is stuck onto it. Using the joint material of the type ensures good adhesiveness and good durability and even good mechanical strength of the bonded articles.

For further improving the dispersibility of the synthetic resin emulsion powder of the invention that serves as additives or joint materials for hydraulic substances, various additives may be added to the emulsion powder. Preferably, the additives are added to the synthetic resin emulsion before the emulsion is spray-dried, and then the resulting mixture is spray-dried, as the process gives uniform mixtures. Preferably, the additives are soluble in water. Not specifically defined, the amount of the water-soluble additive to be in the resin emulsion powder may be suitably so controlled that it does not have any negative influence on the physical properties such as water resistance of the emulsion. The additives include, for example, hydroxyethyl cellulose, methyl cellulose, starch derivatives, polyvinylpyrrolidone, polyethylene oxide, as well as water-soluble alkyd resins, water-soluble phenolic resins, water-soluble urea resins, water-soluble melamine resins, water-soluble naphthalenesulfonic acid resins, water-soluble amino resins, water-soluble polyamide resins, water-soluble acrylic resins, water-soluble polycarboxylic acid resins, water-soluble polyester resins, water-soluble polyurethane resins, water-soluble polyol resins, water-soluble epoxy resins.

In case where the synthetic resin emulsion powder of the invention is used for additives or joint materials for hydraulic substances, especially for additives to cement and mortar, any of AE agent (Air-Entraining Admixtures), water-reducing agent, fluidizing agent, water-retaining agent, thickener, waterproofing agent, defoaming agent and the like may be suitably added thereto.

The synthetic resin emulsion powder of the invention may also be used for adhesives, coating compositions, paper processing agents and others. For those applications, the emulsion powder may suitably contain any of viscosity improver, water-retaining agent, tackifier, thickener, pigment dispersant, stabilizer, etc.

EXAMPLES

The invention is described concretely with reference to the following Examples, which, however, are not intended to restrict the scope of the invention. In the Examples, "part" and "%" are all by weight.

Emulsion Production Example 1

80 parts of aqueous 9.5% solution of "PVA217" (by Kuraray, having a degree of polymerization of 1700 and a saponification degree of 88 mol %) was fed into a pressure autoclave equipped with a nitrogen inlet mouth, a thermometer and a stirrer, heated up to 60° C., and then purged with nitrogen. 80 parts of vinyl acetate was fed into it, and then ethylene was into it to an increased pressure of 4.9 MPa. 2 g of aqueous 0.5% hydrogen peroxide solution and 0.3 g of aqueous 2% Rongalite solution were fed into it under pressure, and the polymerization was then started. When the remaining vinyl acetate concentration reached 10%, ethylene was discharged out until the ethylene pressure was lowered to 2.0 MPa. Then, 0.3 g of aqueous 3% hydrogen peroxide solution was introduced into it under pressure to complete the polymerization. During the polymerization, no aggregation was found, and the polymerization stability of the system was good. The process gave ethylene-vinyl acetate copolymer emulsion (Em-1) having a solid concentration of 55% and an ethylene content of 18% by weight.

Emulsion Production Example 2

5 parts of mercapto-terminated PVA (having a degree of polymerization of 550, a saponification degree of 88.3 mol % and a mercapto group content of $3.3 \times 10^{-5}$ equivalent/g) and 90 parts of ion-exchanged water were fed into a glass vessel equipped with a reflux condenser, a dropping funnel, a thermometer, a nitrogen inlet mouth and a stirrer, and completely dissolved at 95° C. Next, its pH was made to be 4 with diluted sulfuric acid added thereto, and then 10 parts of methyl methacrylate, 10 parts of n-butyl acrylate and 0.1 parts of n-dodecylmercaptan were added to it with stirring at 150 rpm. This was purged with nitrogen and heated up to 70° C. 5 parts of 1% potassium persulfate was added to it to start the polymerization. Then, a mixture of 40 parts of methyl methacrylate, 40 parts of n-butyl acrylate and 0.4 parts of n-dodecylmercaptan was continuously added to it, over a period of 2 hours. 3 hours after the start of the polymerization, the conversion reached 99.5%, and the polymerization was stopped in this stage. The process gave stable methyl methacrylate/n-butyl acrylate copolymer emulsion (Em-2) having a solid concentration of 52.0%.

Emulsion Production Example 3

An emulsion (Em-3) was produced in the same manner as in Emulsion Production Example 2, for which, however, a mercapto-terminated PVA (having an ethylene content of 0.5 mol %, a degree of polymerization of 550, a saponification degree of 88.3%, and a mercapto group content of $3.3 \times 10^{-5}$ equivalent/g) was used in place of the mercapto-terminated PVA (having a degree of polymerization of 550, a saponification degree of 88.3 mol %, and a mercapto group content of $3.3 \times 10^{-5}$ equivalent/g) in Emulsion Production Example 2.

Example 1

A mixture of 100 parts, in terms of the solid content thereof, of the ethylene-vinyl acetate copolymer emulsion (A) (Em-1) obtained in Emulsion Production Example 1 and 200 parts of aqueous 5% solution of ethylene-modified PVA (B) (PVA-1 having an ethylene unit content of 5 ml %, a degree of polymerization of 500 and a saponification degree of 95 mol %), and 2%, relative to the solid content of the emulsion, of fine powder of silicic anhydride (having a mean particle size of 2 µm) were separately sprayed into hot air at 120° C. at the same time and dried to obtain an emulsion powder having a mean particle size of 20 µm.

Property Evaluation of Emulsion Powder:

100 parts of ion-exchanged water at 20° C. was added to 100 parts of the emulsion powder and well stirred in a stirrer, and this evaluated for the following physical properties thereof. The results are given in Table 1.

Redispersibility:

The redispersed emulsion was filtered through a 200-mesh stainless metal gauze filter, the residue was dried at 105° C. for 5 hours, and its ratio was measured.

Filtration Residue (%)=(weight of dried residue/ weight of redispersed emulsion powder)×100.

The smaller filtration residue means that the emulsion powder gives hardened articles having a better mechanical strength when it is used for additives or joint materials for hydraulic substances.

The invention gives emulsion powder having a filtration residue of not larger than 5% (see Table 1), and even emulsion powder having a filtration residue of not larger than 3% (see Table 2-1), and still even emulsion powder having a filtration residue of not larger than 2%, or even not larger than 1% (see Table 3-1).

Condition after Redispersion:

The condition of the redispersed emulsion was observed with the naked eye and with an optical microscope, and evaluated according to the following criteria:

◉: Excellent; The redispersion was uniform and had a mean particle size of not larger than 50 µm.

○: Good; The redispersion was uniform and contained no non-dispersed matter (blobs).

Δ: Fair; Though redispersed, the emulsion still contained non-dispersed matter.

x: Poor; Not redispersed.

Film Formability:

The redispersion was cast on a glass plate at 50° C. and dried, and its film formability was evaluated according to the following criteria:

○: Excellent; A uniform film was formed, and it was tough.

Δ: Fair; A film was formed, but it was brittle.

x: Poor; No uniform film was formed.

Water Resistance (Film Dissolution in Water):

At 20° C., the redispersed emulsion was formed into a film having a thickness of 100 µm. The film was dipped in water at 20° C. for 24 hours, and its dissolution was calculated according to the following equation:

Dissolution (%)={1−(absolute dry weight of dipped film)/(absolute dry weight of non-dipped film)}× 100, wherein the absolute dry weight of the non-dipped film is represented by:

wet weight of non-dipped film−(wet weight of non-dipped film×water content (%) of film/100);

the absolute dry weight of the dipped film means the weight of the dipped film absolutely dried at 105° C.

The smaller dissolution means that the emulsion powder has better water resistance and better redispersibility. The invention gives emulsion powder of which the film dissolution is not higher than 10% (see Table 3-1), preferably not higher than 8% (see Table 2-1), more preferably or not higher than 7% (see Table 1).

Storage Stability:

The redispersed emulsion was left at 20° C. and at 0° C. After 1 week, its condition was observed and evaluated according to the following criteria:

○: Excellent; No change.

Δ: Fair; Thickened.

x: Poor; Gelled.

Gel Content:

The emulsion powder was redispersed in water at 20° C. Concretely, 100 parts of the emulsion powder was redispersed in 100 parts of ion-exchanged water at 20° C. The resulting redispersion was cast onto a PET (polyethylene terephthalate) film at 20° C. and 65% RH, and dried for 7 days to form a dry film thereon having a thickness of 500 µm. The film was blanked out to give a circular piece having a diameter of 2.5 cm. Thus prepared, the sample was subjected to Soxhlet extraction with acetone for 24 hours, and then further extracted in boiling water for 24 hours. After thus extracted, the insoluble fraction (gel content) of the film was obtained.

Gel Content (%)=(absolute dry weight of extracted film)/(absolute dry weight of non-extracted film)×100, wherein the absolute dry weight of the non-extracted film is represented by:

wet weight of non-extracted film−(wet weight of non-extracted film×water content (%) of film/100);

the water content of film is obtained by absolutely drying a sample of the film (this differs from the sample of the film to be extracted with acetone and boiling water) at 105° C. for 4 hours, followed by measuring in advance the water content of the film sample;

the absolute dry weight of the extracted film means the weight of the extracted film absolutely dried at 105° C. for 4 hours.

The larger gel content means that the polyvinyl alcohol (B) is grafted to a higher degree on the dispersoid (polymer) and the redispersibility of the emulsion powder is thereby improved better. The invention gives emulsion powder of which the gel content is not lower than 20% (see Table 1, Table 3-1), preferably not lower than 30% (see Table 2-1).

Example 2

An emulsion powder was produced in the same manner as in Example 1, for which, however, an ethylene-modified PVA (B) (PVA-2 having an ethylene unit content of 10 mol %, a degree of polymerization of 500 and a saponification degree of 98 mol %) was used in place of the ethylene-modified PVA (B) (PVA-1) in Example 1. Also in the same manner as in Example 1, the physical properties of the emulsion powder thus obtained herein were measured and evaluated. The results are given in Table 1.

Example 3

An emulsion powder was produced in the same manner as in Example 1, for which, however, an ethylene-modified PVA (B) (PVA-3 having an ethylene unit content of 5 mol %, a degree of polymerization of 500 and a saponification degree of 88 mol %) was used in place of the ethylene-modified PVA (B) (PVA-1) in Example 1. Also in the same manner as in Example 1, the physical properties of the emulsion powder thus obtained herein were measured and evaluated. The results are given in Table 1.

Comparative Example 1

An emulsion powder was obtained in the same manner as in Example 1, for which, however, a non-modified PVA (B)

(PVA-4, Kuraray's "PVA105" having a degree of polymerization of 500 and a saponification degree of 98.5 mol %) was used in place of the ethylene-modified PVA (B) (PVA-1) in Example 1. Also in the same manner as in Example 1, the physical properties of the emulsion powder thus obtained herein were measured and evaluated. The results are given in Table 1.

Comparative Example 2

An emulsion powder was obtained in the same manner as in Example 1, for which, however, a non-modified PVA (B) (PVA-5, Kuraray's "PVA205" having a degree of polymerization of 500 and a saponification degree of 88 mol %) was used in place of the ethylene-modified PVA (B) (PVA-1) in Example 1. Also in the same manner as in Example 1, the physical properties of the emulsion powder thus obtained herein were measured and evaluated. The results are given in Table 1.

Comparative Example 3

An emulsion powder was obtained in the same manner as in Example 1, for which, however, the ethylene-modified PVA (B) (PVA-1) was not used. Also in the same manner as in Example 1, the physical properties of the emulsion powder thus obtained herein were measured and evaluated. The results are given in Table 1.

Example 4

An emulsion powder was produced in the same manner as in Example 1, for which, however, an ethylene-modified PVA (B) (PVA-6 having an ethylene unit content of 5 mol %, a degree of polymerization of 1300 and a saponification degree of 93 mol %) was used in place of the ethylene-modified PVA (B) (PVA-1) in Example 1. Also in the same manner as in Example 1, the physical properties of the emulsion powder thus obtained herein were measured and evaluated. The results are given in Table 1.

Comparative Example 4

An emulsion powder was obtained in the same manner as in Example 1, for which, however, a non-modified PVA (B) (PVA-7, Kuraray's "PVA613" having a degree of polymerization of 1300 and a saponification degree of 95 mol %) was used in place of the ethylene-modified PVA (B) (PVA-1) in Example 1. Also in the same manner as in Example 1, the physical properties of the emulsion powder thus obtained herein were measured and evaluated. The results are given in Table 1.

Example 5

An emulsion powder was produced in the same manner as in Example 1, for which, however, used was 100 parts of aqueous 5% solution of the ethylene-modified PVA (B) (PVA-1). Also in the same manner as in Example 1, the physical properties of the emulsion powder thus obtained herein were measured and evaluated. The results are given in Table 1.

Example 6

An emulsion powder was produced in the same manner as in Example 1, for which, however, used was 300 parts of aqueous 5% solution of the ethylene-modified PVA (B) (PVA-1). Also in the same manner as in Example 1, the physical properties of the emulsion powder thus obtained herein were measured and evaluated. The results are given in Table 1.

Example 7

An emulsion powder was produced in the same manner as in Example 1, for which, however, used was 40 parts of aqueous 5% solution of the ethylene-modified PVA (B) (PVA-1). Also in the same manner as in Example 1, the physical properties of the emulsion powder thus obtained herein were measured and evaluated. The results are given in Table 1.

Example 8

An emulsion powder was produced in the same manner as in Example 1, for which, however, used was 500 parts of aqueous 5% solution of the ethylene-modified PVA (B) (PVA-1). Also in the same manner as in Example 1, the physical properties of the emulsion powder thus obtained herein were measured and evaluated. The results are given in Table 1.

Example 9

An emulsion powder was produced in the same manner as in Example 1, for which, however, an ethylene-modified PVA (B) (PVA-8 having an ethylene unit content of 2.5 mol %, a degree of polymerization of 500 and a saponification degree of 88 mol %) was used in place of the ethylene-modified PVA (B) (PVA-1) in Example 1. Also in the same manner as in Example 1, the physical properties of the emulsion powder thus obtained herein were measured and evaluated. The results are given in Table 1.

Example 10

An emulsion powder was produced in the same manner as in Example 1, for which, however, an ethylene-modified PVA (B) (PVA-9 having an ethylene unit content of 1.5 mol %, a degree of polymerization of 500 and a saponification degree of 88 mol %) was used in place of the ethylene-modified PVA (B) (PVA-1) in Example 1. Also in the same manner as in Example 1, the physical properties of the emulsion powder thus obtained herein were measured and evaluated. The results are given in Table 1.

Comparative Example 5

An emulsion powder was produced in the same manner as in Example 1, for which, however, an ethylene-modified PVA (B) (PVA-10 having an ethylene unit content of 0.5 mol %, a degree of polymerization of 500 and a saponification degree of 95 mol %) was used in place of the ethylene-modified PVA (B) (PVA-1) in Example 1. Also in the same manner as in Example 1, the physical properties of the emulsion powder thus obtained herein were measured and evaluated. The results are given in Table 1.

Comparative Example 6

Powdering of emulsion was tried in the same manner as in Example 1, for which, however, an ethylene-modified PVA (B) (PVA-11 having an ethylene unit content of 25 mol %, a degree of polymerization of 500 and a saponification degree of 95 mol %) was used in place of the ethylene-modified PVA (B) (PVA-1) in Example 1. However, the PVA became remarkably cloudy when put into water and could not completely dissolve in water. The cloudy PVA liquid was mixed with the emulsion and processed in the same manner as in Example 1. The physical properties of the resulting emulsion powder were measured and evaluated also in the same manner as in Example 1. The results are given in Table 1.

Example 11

An emulsion powder was produced in the same manner as in Example 1, for which, however, an ethylene-modified PVA (B) (PVA-12 having an ethylene unit content of 3 mol %, a 1,2-glycol bond content of 1.9 mol %, a degree of polymerization of 1300 and a saponification degree of 93 mol %) that had been prepared through high-temperature polymerization was used in place of the ethylene-modified PVA (B) (PVA-1) in Example 1. Also in the same manner as in Example 1, the physical properties of the emulsion powder thus obtained herein were measured and evaluated. The results are given in Table 1.

Example 12

An emulsion powder was produced in the same manner as in Example 1, for which, however, an ethylene-modified PVA (B) (PVA-13 having an ethylene unit content of 5 mol %, a 1,2-glycol bond content of 2.2 mol %, a degree of polymerization of 500 and a saponification degree of 88 mol %) that had been prepared through high-temperature polymerization was used in place of the ethylene-modified PVA (B) (PVA-1) in Example 1. Also in the same manner as in Example 1, the physical properties of the emulsion powder thus obtained herein were measured and evaluated. The results are given in Table 1.

Example 13

An emulsion powder was produced in the same manner as in Example 1, for which, however, the methyl methacrylate/ n-butyl acrylate copolymer emulsion (A) (Em-2) prepared in Emulsion Production Example 2 was used in place of Em-1 in Example 1. Also in the same manner as in Example 1, the physical properties of the emulsion powder thus obtained herein were measured and evaluated. The results are given in Table 1.

Comparative Example 7

An emulsion powder was produced in the same manner as in Example 13, for which, however, non-modified PVA (B) (PVA-5) was used in place of the ethylene-modified PVA (B) (PVA-1) in Example 13. In the same manner as in Example 1, the physical properties of the emulsion powder thus obtained herein were measured and evaluated. The results are given in Table 1.

Comparative Example 8

An emulsion powder was produced in the same manner as in Comparative Example 1, for which, however, Em-3 was used in place of Em-1. In the same manner as in Example 1, the physical properties of the emulsion powder thus obtained herein were measured and evaluated. The results are given in Table 1.

Comparative Example 9

Powdering of emulsion was tried in the same manner as in Example 1, for which, however, an ethylene-modified PVA (B) (PVA-14 having an ethylene unit content of 15 mol %, a degree of polymerization of 1300 and a saponification degree of 93 mol %) was used in place of the ethylene-modified PVA (B) (PVA-1) in Example 1. However, the PVA became cloudy when put into water and could not completely dissolve in water. The cloudy PVA liquid was mixed with the emulsion and processed in the same manner as in Example 1. The physical properties of the resulting emulsion powder were measured and evaluated also in the same manner as in Example 1. The results are given in Table 1.

Comparative Example 10

An emulsion powder was produced in the same manner as in Example 1, for which, however, a propylene-modified PVA (B) (PVA-15 having a propylene unit content of 5 mol %, a degree of polymerization of 1300 and a saponification degree of 93 mol %) was used in place of the ethylene-modified PVA (B) (PVA-1) in Example 1. Also in the same manner as in Example 1, the physical properties of the emulsion powder thus obtained herein were measured and evaluated. The results are given in Table 1.

Example 14

An ethylene-vinyl acetate copolymer emulsion (Em-4) having a solid concentration of 55% and an ethylene content of 18% by weight was prepared in the same manner as in Emulsion Production Example 1, for which, however, PVA-31 (having an 1,2-glycol bond content of 2.2 mol %, a degree of polymerization of 1700 and a saponification degree of 88 mol %) that is prepared in PVA Production Example 31 mentioned hereinunder was used in place of Kuraray's "PVA217" in Emulsion Production Example 1.

Next, an emulsion powder was produced in the same manner as in Example 1, for which, however, Em-4 was used in place of the ethylene-vinyl acetate copolymer emulsion (A) (Em-1) in Example 1. Also in the same manner as in Example 1, the physical properties of the emulsion powder thus obtained herein were measured and evaluated. The results are given in Table 1.

The emulsion powders obtained in Examples 1 to 14 and Comparative Examples 1 to 10 were tried for additives and joint materials for hydraulic substances, and their physical properties were measured and evaluated. The results are given in Table 2.

Property Evaluation of Additives to Hydraulic Substances:
Property of Additive to Cement Mortar:
Physical Test of Cement Mortar:
1) Mortar Composition:
Ratio by weight, additive to hydraulic substance/cement=0.10,
Ratio by weight, sand/cement=3.0,
Ratio by weight, water/cement=0.6.
2) Slump value:
Measured according to JIS A-1173.
(This is an index indicating the dispersibility in cement mortar.)
3) Bending Strength:
Measured according to JIS A-6203.

4) Compression Strength:
Measured according to JIS A-6203.

100 parts of ion-exchanged water was added to 100 parts of the additive for hydraulic substances, and well stirred by the use of a stirrer. The physical properties of the resulting mixture were measured in the manner mentioned below. The results are given in Tables 1 and 2.

Water Resistance (Film Dissolution in Water):

At 20° C., the redispersed emulsion was formed into a film having a thickness of 100 μm. The film was dipped in water at 20° C. for 24 hours, and its dissolution was calculated according to the following equation:

Dissolution (%)={1−(absolute dry weight of dipped film)/(absolute dry weight of non-dipped film)}× 100, wherein the absolute dry weight of the non-dipped film is represented by:

wet weight of non-dipped film−(wet weight of non-dipped film×water content (%) of film/100);

the absolute dry weight of the dipped film means the weight of the dipped film absolutely dried at 105° C.

Property Evaluation of Joint Materials for Hydraulic Substances:

Property of Joint Material for Cement Mortar:

The emulsion powders obtained in Examples 1 to 14 and Comparative Examples 1 to 10 were directly used for joint materials, and the samples thus constructed were tested in the manner mentioned below.

Adhesion Strength Test:

1) Substrate for Test

The concrete substrate for the test was formed of a standard formulation in the art of construction. Concretely, 300 parts of portland cement, 800 parts of siliceous sand, 1000 parts of coarse aggregate (ballast) and 180 parts of water were kneaded and then cast into a plywood frame having a size of 300 mm×300 mm×50 mm thickness. This was cured in a laboratory (temperature 20° C., relative humidity (RH) 65%) for 28 days. Thus constructed, the sheet was used as the substrate in this test.

2) Coating Mortar:

The coating mortar to be used in the test was prepared by kneading cement, aggregate (standard sand) and water in accordance with the method stipulated in 9.4 in JIS R5201. Concretely, the ratio by weight of cement to aggregate is 1/2, and the ratio of water to cement is so controlled that the flow of the resulting mixture may be 170±5.

The cement used herein is normal portland cement stipulated in JIS R5210 (portland cement); and the aggregate is Toyoura standard sand stipulated in 9.2 in JIS R5210.

3) Method of Fabricating Test Samples:

The joint material was uniformly applied onto the surface of the test substrate of above 1), using a brush, and then left in an atmosphere at 20° C. and 65% RH for 24 hours. The amount of the joint material applied onto it was 50 g/m$^2$ in terms of the solid content thereof. Next, the mortar of above 2) was applied onto it, using a metal trowel, to form thereon a mortar layer having a thickness of 6 mm, and then cured in an atmosphere at 20° C. and 80% RH for 48 hours. Further, this was cured in a laboratory for 26 days to b a test sample.

4) Test for Adhesion Strength in Standard Condition:

Through the mortar face thereof, the test sample fabricated in the above 3) was cut into pieces each having a size of 40 mm×90 mm, to a depth that reaches the substrate. Thus cut, the test piece was tested for the adhesion strength, according to the test method stipulated in 5.6 in JIS A6916. Five points in one sample were tested, and the data were averaged.

5) Test for Resistance to Heat Cycle (Durability Test):

The test samples fabricated in the above 3) were exposed to an IR lamp for 105 minutes so that its surface temperature could be 70° C., and then sprinkled with water for 15 minutes. This is one heat cycle. Every sample was subjected to 300 heat cycles. In the test, the temperature of water applied to each sample was 15±5° C., and the amount of water applied to one sample was 6 liters/min. After 300 heat cycles, the samples were left under ordinary condition for 24 hours, and then tested in the same manner as in the above 4).

6) Test for Resistance to Freezing and Thawing (Durability Test):

The test samples fabricated in the above 3) were dipped in water at 20±3° C. for 15 hours, then dipped in a thermostat tank at −20±3° C. for 3 hours, and thereafter dipped in a thermostat tank at 70±3° C. for 6 hours. This is on freezing and thawing cycle. Every sample was subjected to 50 cycles. After 50 cycles, the samples were left under ordinary condition for 24 hours, and then tested in the same manner as in the above 4).

Emulsion Production Example 21

80 parts of aqueous 9.5% solution of ethylene-modified PVA (PVA-21 having an ethylene unit content of 4 mol %, a degree of polymerization of 1300, and a saponification degree of 93 mol %) was fed into a pressure autoclave equipped with a nitrogen inlet mouth, a thermometer and a stirrer, heated up to 60° C., and then purged with nitrogen. 80 parts of vinyl acetate was fed into it, and then ethylene was into it to an increased pressure of 4.9 MPa. 2 g of aqueous 0.5% hydrogen peroxide solution and 0.3 g of aqueous 2% Rongalite solution were fed into it under pressure, and the polymerization was then started. When the remaining vinyl acetate concentration reached 10%, ethylene was discharged out until the ethylene pressure was lowered to 2.0 MPa. Then, 0.3 g of aqueous 3% hydrogen peroxide solution was introduced into it under pressure to complete the polymerization. During the polymerization, no aggregation was found, and the polymerization stability of the system was good. The process gave ethylene-vinyl acetate copolymer emulsion (Em-21) having a solid concentration of 55% and an ethylene content of 18% by weight.

Emulsion Production Example 22

An ethylene-vinyl acetate copolymer emulsion (Em-22) having a solid concentration of 55% and an ethylene content of 18.3% by weight was produced in the same manner as in Emulsion Production Example 21, for which, however, an ethylene-modified PVA (PVA-22 having an ethylene unit content of 3 mol %, a degree of polymerization of 500, and a saponification degree of 95 mol %) was used in place of PVA-21 in Emulsion Production Example 21.

Emulsion Production Example 23

An ethylene-vinyl acetate copolymer emulsion (Em-23) having a solid concentration of 55% and an ethylene content of 17.8% by weight was produced in the same manner as in Emulsion Production Example 21, for which, however, an ethylene-modified PVA (PVA-23 having an ethylene unit content of 5 mol %, a degree of polymerization of 1300, and a saponification degree of 98 mol %) was used in place of PVA-21 in Emulsion Production Example 21.

Emulsion Production Example 24

An ethylene-vinyl acetate copolymer emulsion (Em-24) having a solid concentration of 55% and an ethylene content of 18% by weight was produced in the same manner as in Emulsion Production Example 21, for which, however, a non-modified PVA (PVA-24 having a degree of polymerization of 1300, and a saponification degree of 93 mol %) was used in place of PVA-21 in Emulsion Production Example 21.

Emulsion Production Example 25

An ethylene-vinyl acetate copolymer emulsion (Em-25) having a solid concentration of 55% and an ethylene content of 18.4% by weight was produced in the same manner as in Emulsion Production Example 21, for which, however, a non-modified PVA (PVA-25 having a degree of polymerization of 500, and a saponification degree of 88 mol %, Kuraray's "PVA205") was used in place of PVA-21 in Emulsion Production Example 21.

Emulsion Production Example 26

An ethylene-vinyl acetate copolymer emulsion (Em-26) having a solid concentration of 55% and an ethylene content of 18.1% by weight was produced in the same manner as in Emulsion Production Example 21, for which, however, a non-modified PVA (PVA-26 having a degree of polymerization of 1000, and a saponification degree of 98.5 mol %, Kuraray's "PVA110") was used in place of PVA-21 in Emulsion Production Example 21.

Emulsion Production Example 27

An ethylene-vinyl acetate copolymer emulsion (Em-27) having a solid concentration of 55% and an ethylene content of 17.8% by weight was produced in the same manner as in Emulsion Production Example 21, for which, however, an ethylene-modified PVA (PVA-27 having an ethylene unit content of 3 mol %, a 1,2-glycol bond content of 1.9 mol %, a degree of polymerization of 1300, and a saponification degree of 93 mol %) that had been prepared through high-temperature polymerization was used in place of PVA-21 in Emulsion Production Example 21.

Emulsion Production Example 28

An ethylene-vinyl acetate copolymer emulsion (Em-28) having a solid concentration of 55% and an ethylene content of 17.9% by weight was produced in the same manner as in Emulsion Production Example 21, for which, however, an ethylene-modified PVA (PVA-28 having an ethylene unit content of 5 mol %, a 1,2-glycol bond content of 2.2 mol %, a degree of polymerization of 500, and a saponification degree of 93 mol %) that had been prepared through high-temperature polymerization was used in place of PVA-21 in Emulsion Production Example 21.

Emulsion Production Example 29

An ethylene-vinyl acetate copolymer emulsion (Em-29) having a solid concentration of 55% and an ethylene content of 17.8% by weight was produced in the same manner as in Emulsion Production Example 21, for which, however, an ethylene-modified PVA (PVA-29 having an ethylene unit content of 2.5 mol %, a 1,2-glycol bond content of 1.6 mol %, a degree of polymerization of 500, and a saponification degree of 88 mol %) was used in place of PVA-21 in Emulsion Production Example 21.

Emulsion Production Example 210

An ethylene-vinyl acetate copolymer emulsion (Em-210) having a solid concentration of 55% and an ethylene content of 17.8% by weight was produced in the same manner as in Emulsion Production Example 21, for which, however, an ethylene-modified PVA (PVA-210 having an ethylene unit content of 1.5 mol %, a 1,2-glycol bond content of 1.6 mol %, a degree of polymerization of 500, and a saponification degree of 88 mol %) was used in place of PVA-21 in Emulsion Production Example 21.

Emulsion Production Example 211

An ethylene-vinyl acetate copolymer emulsion (Em-211) having a solid concentration of 55% and an ethylene content of 17.8% by weight was produced in the same manner as in Emulsion Production Example 21, for which, however, an ethylene-modified PVA (PVA-211 having an ethylene unit content of 0.5 mol %, a 1,2-glycol bond content of 1.6 mol %, a degree of polymerization of 500, and a saponification degree of 95 mol %) was used in place of PVA-21 in Emulsion Production Example 21.

Emulsion Production Example 212

Emulsion polymerization was tried in the same manner as in Emulsion Production Example 21, using an ethylene-modified PVA (PVA-212 having an ethylene unit content of 25 mol %, a 1,2-glycol bond content of 1.1 mol %, a degree of polymerization of 500, and a saponification degree of 95 mol %) in place of PVA-21 in Emulsion Production Example 21. In this, however, the system was unstable during emulsion polymerization, and it could not produce an emulsion.

Emulsion Production Example 213

5 parts of ethylene-modified PVA (PVA-21) and 90 parts of ion-exchanged water were fed into a glass vessel equipped with a reflux condenser, a dropping funnel, a thermometer, a nitrogen inlet mouth and a stirrer, and completely dissolved at 95° C. Next, its pH was mad to be 4 with diluted sulfuric acid added there to, and then 10 parts of methyl methacrylate, 10 parts of n-butyl acrylate and 0.1 parts of n-dodecylmercaptan were added to it with stirring at 150 rpm. This was purged with nitrogen and heated up to 70° C. 5 parts of 1% potassium persulfate was added to it to start the polymerization. Then, a mixture of 40 parts of methyl methacrylate, 40 parts of n-butyl acrylate and 0.4 parts of n-dodecylmercaptan was continuously added to it, over a period of 2 hours. 3 hours after the start of the polymerization, the conversion reached 99.2%, and the polymerization was stopped in this stage. The process gave stable methyl methacrylate/n-butyl acrylate copolymer emulsion (Em-212) having a solid concentration of 51.5%.

Emulsion Production Example 214

A methyl methacrylate/n-butyl acrylate copolymer emulsion (Em-213) having a solid concentration of 52% was produced in the same manner as in Emulsion Production Example 213, for which, however, non-modified PVA (PVA-25) was used in place of PVA-21 in Emulsion Production Example 213.

Emulsion Production Example 215

5 parts of mercapto-terminated PVA (having an ethylene content of 0.5 mol %, a degree of polymerization of 550, a saponification degree of 88.3 mol % and a mercapto group content of $3.3 \times 10^{-5}$ equivalent/g) (PVA-213) and 90 parts of ion-exchanged water were fed into a glass vessel equipped with a reflux condenser, a dropping funnel, a thermometer, a nitrogen inlet mouth and a stirrer, and completely dissolved at 95° C. Next, its pH was made to be 4 with diluted sulfuric acid added thereto, and then 10 parts of methyl methacrylate, 10 parts of n-butyl acrylate and 0.1 parts of n-dodecylmercaptan were added to it with stirring at 150 rpm. This was purged with nitrogen and heated up to 70° C. 5 parts of 1% potassium persulfate was added to it to start the polymerization. Then, a mixture of 40 parts of methyl methacrylate, 40 parts of n-butyl acrylate and 0.4 parts of n-dodecylmercaptan was continuously added to it, over a period of 2 hours. 3 hours after the start of the polymerization, the conversion reached 99.5%, and the polymerization was stopped in this stage. The process gave stable methyl methacrylate/n-butyl acrylate copolymer emulsion (Em-214) having a solid concentration of 52.0%.

Emulsion Production Example 216

An ethylene-vinyl acetate copolymer emulsion (Em-215) having a solid concentration of 55% and an ethylene content of 17.8% by weight was produced in the same manner as in Emulsion Production Example 21, for which, however, PVA (having a 1,2-glycol bond content of 1.9 mol %, a degree of polymerization of 1300, and a saponification degree of 93 mol %) (PVA-214) that had been prepared through high-temperature polymerization was used in place of PVA-21 in Emulsion Production Example 21.

Example 21

100 parts of the ethylene-vinyl acetate copolymer emulsion (A) (Em-21) obtained in Emulsion Production Example 21 was diluted with 50 parts of distilled water added thereto, and 2%, relative to the solid content of the emulsion, of fine powder of silicic anhydride (having a mean particle size of 2 μm) were separately sprayed into hot air at 120° C. at the same time and dried to obtain an emulsion powder having a mean particle size of 20 μm.
Property Evaluation of Emulsion Powder:
 The emulsion powder was evaluated in the same manner as in Example 1.
 Property of Additive for Cement Mortar:
<1> Physical Test of Cement Mortar:
 1) Mortar Composition:
  Ratio by weight of solid content of aqueous emulsion/cement=0.10;
  Ratio by weight of sand/cement=2.5;
  Ratio by weight of water/cement=0.5.
 2) Slump Value:
  Measured according to JIS A-1173.
  (This is an index indicating the dispersibility in cement mortar.)
 3) Bending Strength:
  Measured according to JIS A-6203.
 4) Compression Strength:
  Measured according to JIS A-6203.

Examples 22 to 27, Comparative Examples 21 to 24

Emulsion powders were produced in the same manner as in Example 21, for which, however, any of Em-22 to Em-211 prepared in Emulsion Production Examples 22 to 211 was used in place of Em-21 in Example 21. Also in the same manner as in Example 21, the physical properties of the emulsion powders thus obtained herein were measured and evaluated. The results are given in Table 2-1.

Examples 28 to 210

A mixture of 100 parts of the ethylene-vinyl acetate copolymer emulsion (A) (Em-21) that had been prepared in Emulsion Production Example 21 and a predetermined amount of aqueous 5% solution of ethylene-modified PVA (B) (PVA-22), and 2%, relative to the solid content of the emulsion, of fine powder of silicic anhydride were separately sprayed into hot air at 120° C. at the same time and dried to obtain an emulsion powder. The results are given in Table 2-1.

Example 211, Comparative Examples 25 to 27

Emulsion powders were produced in the same manner as in Example 21, for which, however, any of methyl methacrylate/n-butyl acrylate copolymer emulsions (A) (Em-212, Em-213, Em-214, Em-215) prepared in Emulsion Production Examples 213 to 216 was used in place of Em-21 in Example 21. Also in the same manner as in Example 21, the physical properties of the emulsion powders thus obtained herein were measured and evaluated. The results are given in Table 2-1.

Example 212

A mixture of 100 parts of the methyl acrylate/n-butyl acrylate copolymer emulsion (A) (Em-212) that had been prepared in Emulsion Production Example 213 and 200 parts of aqueous 5% solution of ethylene-modified PVA (B) (PVA-22), and 2%, relative to the solid content of the emulsion, of fine powder of silicic anhydride were separately sprayed into hot air at 120° C. at the same time and dried to obtain an emulsion powder. The results are given in Table 2-1.

PVA Production Example 31

2940 g of vinyl acetate, 60 g of methanol and 0.088 g of tartaric acid were fed into a 5-liter pressure reactor equipped with a stirrer, a nitrogen inlet mouth and an initiator inlet mouth, and, while this was bubbled with nitrogen gas at room temperature, the pressure in the reactor was increased up to 2.0 MPa, left as such for 10 minutes, and then degassed. This operation was repeated three times whereby the reactor was thus purged with nitrogen. An initiator, 2,2'-azobis(cyclohexane-1-carbonitrile) (V-40) was dissolved in methanol to prepare an initiator solution having a concentration of 0.2 g/liter, which was then bubbled and purged with nitrogen gas. Next, the polymerization reactor was heated to have an inner temperature of 120° C., and the pressure in the reactor in this stag was 0.5 MPa. Next, 2.5 ml of the initiator solution was introduced into the reactor to start the polymerization. During the polymerization, the temperature of the system was kept at 120° C., and the initiator solution of V-40 was continuously added to the system at a rate of 10.0 ml/hr. During the polymerization in that condition, the pressure in the reactor was 0.5 MPa. After 3 hours, this was cooled to terminate the polymerization. In this stage, the solid concentration in the resulting reaction system was 24%. Next, methanol was intermittently added to the system at 30° C. under reduced pressure to remove the residual vinyl acetate monomer. The process thus gave a methanol solution of polyvinyl acetate (concentration, 33%). Methanol was added to the thus-obtained polyvinyl acetate solution to make it have a polymer concentration of 25%. 400 g of the thus-controlled methanol solution of polyvinyl acetate (100 g of polyvinyl acetate in the solution) was subjected to saponification at 40° C. with an alkali solution (methanol solution of 10% NaOH) added thereto. The amount of the alkali solution added to the polymer solution was 7 g, and this corresponds to a molar ratio (MR) of alkali to the vinyl acetate unit in the polyvinyl acetate, of 0.015. About 2 minutes after the alkali addition, the system gelled and this was ground in a mill and then left as such for 1 hour to promote the saponification of the polymer. Next, 1000 g of methyl acetate was added to it to neutralize the remaining alkali. With a phenolphthalein indicator, the termination of the neutralization was confirmed. Then, a white solid PVA was collected through filtration. 1000 g of methanol was added to the thus-collected PVA and kept at room temperature for 3 hours, with which the polymer PVA was thus washed. The washing operation was repeated three times. Then, this was dewatered through centrifugation, and the resulting PVA was dried in a drier at 70° C. for 2 days to obtain a dry PVA (PVA-31). Thus obtained, the PVA (PVA-31) had a saponification degree of 88 mol %. On the other hand, the methanol solution of polyvinyl acetate that had been obtained by removing the residual vinyl acetate monomer after the polymerization was subject to saponification with an alkali at an alkali molar ratio of 0.5, then ground and kept at 60° C. for 5 hours to promote the saponification of the polymer. Then, this was subjected to Soxhlet extraction washing with methanol for 3 days and then dried at 80° C. under reduced pressure for 3 days to obtain a purified PVA. The mean degree of polymerization of the PVA was measured in an ordinary manner of JIS K6726, and was 1700. The 1,2-glycol bond content of PVA can be obtained from the peak appearing in the NMR pattern thereof. Concretely, PVA to be analyzed is subjected to saponification to have a saponification degree of at least 99.9 mol %, then well washed with methanol, and dried at 90° C. under reduced pressure for 2 days. Thus processed, the PVA is dissolved in DMSO-D6 and a few drops of trifluoroacetic acid are added the reto to prepare a sample. This is subjected to 500 MHz-proton NMR (JEOL GX-500) at 80° C. to obtain its NMR pattern.

The peak derived from the methine group in the vinyl alcohol unit in PVA is assigned to 3.2 to 4.0 ppm (integral value A), and the peak derived from one methine group of the 1,2-glycol bond therein is assigned to 3.25 ppm (integral value B), and the 1,2-glycol bond content of PVA is calculated according to the following formula:

1,2-Glycol bond content (mol %)=$B/A$×100.

The 1,2-glycol bond content of the pure PVA produced herein was obtained from the data in 500 MHz-proton NMR (with JEOL GX-500) in the same manner as described above and it was 2.2 mol %.

PVA Production Example 32

2400 g of vinyl acetate, 600 g of methanol and 0.088 g of tartaric acid were fed into a 5-liter pressure reactor equipped with a stirrer, a nitrogen inlet mouth and an initiator inlet mouth, and, while this was bubbled with nitrogen gas at room temperature, the pressure in the reactor was increased up to 2.0 MPa, left as such for 10 minutes, and then degassed. This operation was repeated three times whereby the reactor was thus purged with nitrogen. An initiator, 2,2'-azobis(cyclohexane-1-carbonitrile) (V-40) was dissolved in methanol to prepare an initiator solution having a concentration of 0.2 g/liter, which was then bubbled and purged with nitrogen gas. Next, the polymerization reactor was heated to have an inner temperature of 120° C., and the pressure in the reactor in this stag was 0.5 MPa. Next, 2.5 ml of the initiator solution was introduced into the reactor to start the polymerization. During the polymerization, the temperature of the system was kept at 120° C., and the initiator solution of V-40 was continuously added to the system at a rate of 10.0 ml/hr. During the polymerization in that condition, the pressure in the reactor was 0.5 MPa. After 3 hours, this was cooled to terminate the polymerization. In this stage, the solid concentration in the resulting reaction system was 24%. Next, methanol was intermittently added to the system at 30° C. under reduced pressure to remove the residual vinyl acetate monomer. The process thus gave a methanol solution of polyvinyl acetate (concentration, 33%). Methanol was added to the thus-obtained polyvinyl acetate solution to make it have a polymer concentration of 25%. 400 g of the thus-controlled methanol solution of polyvinyl acetate (100 g of polyvinyl acetate in the solution) was subjected to saponification at 40° C. with an alkali solution (methanol solution of 10% NaOH) added thereto. The amount of the alkali solution added to the polymer solution was 7 g, and this corresponds to a molar ratio (MR) of alkali to the vinyl acetate unit in the polyvinyl acetate, of 0.015. About 2 minutes after the alkali addition, the system gelled and this was ground in a mill and then left as such for 1 hour to promote the saponification of the polymer. Next, 1000 g of methyl acetate was added to it to neutralize the remaining alkali. With a phenolphthalein indicator, the termination of the neutralization was confirmed. Then, a white solid PVA was collected through filtration. 1000 g of methanol was added to the thus-collected PVA and kept at room temperature for 3 hours, with which the polymer PVA was thus washed. The washing operation was repeated three times. Then, this was dewatered through centrifugation, and the resulting PVA was dried in a drier at 70° C. for 2 days to obtain a dry PVA (PVA-32). Thus obtained, the PVA (PVA-32) had a saponification degree of 98 mol %. On the other hand, the methanol solution of polyvinyl acetate that had been obtained by removing the residual vinyl acetate monomer after the polymerization was subject to saponification with an alkali at an alkali molar ratio of 0.5, then ground and kept at 60° C. for 5 hours to promote the saponification of the polymer. Then, this was subjected to Soxhlet extraction washing with methanol for 3 days and then dried at 80° C. under reduced pressure for 3 days to obtain a purified PVA. The mean degree of polymerization of the PVA was measured in an ordinary manner of JIS K6726, and was 500. The 1,2-glycol bond content of the pure PVA was obtained through 500 MHz-proton NMR (with JEOL GX-500) in the same manner as above, and it was 2.2 mol %.

PVA Production Example 33

2850 g of vinyl acetate, 150 g of methanol and 0.086 g of tartaric acid were fed into a 5-liter pressure reactor equipped with a stirrer, a nitrogen inlet mouth and an initiator inlet mouth, and, while this was bubbled with nitrogen gas at room temperature, the pressure in the reactor was increased up to 2.0 MPa, left as such for 10 minutes, and then degassed. This operation was repeated three times whereby the reactor was thus purged with nitrogen. An initiator, 2,2'-azobis(N-butyl- 2-methylpropionamide) was dissolved in methanol to prepare an initiator solution having a concentration of 0.1 g/liter, which was then bubbled and purged with nitrogen gas. Next, the polymerization reactor was heated to have an inner temperature of 150° C., and the pressure in the reactor in this stage was 1.0 MPa. Next, 15.0 ml of the initiator solution was introduced into the reactor to start the polymerization. During the polymerization, the temperature of the system was kept at 150° C., and the initiator solution of 2,2'-azobis(N-butyl-2-methylpropionamide) was continuously added to the system at a rate of 15.8 ml/hr. During the polymerization in that condition, the pressure in the reactor was 1.0 MPa. After 4 hours, this was cooled to terminate the polymerization. In this stage, the solid concentration in the resulting reaction system was 35%. Next, methanol was intermittently added to the system at 30° C. under reduced pressure to remove the residual vinyl acetate monomer. The process thus gave a methanol solution of polyvinyl acetate (concentration, 33%). Methanol was added to the thus-obtained polyvinyl acetate solution to make it have a polymer concentration of 25%. 400 g of the thus-controlled methanol solution of polyvinyl acetate (100 g of polyvinyl acetate in the solution) was subject to saponification at 40° C. with an alkali solution (methanol solution of 10% NaOH) added thereto. The amount of the alkali solution added to the polymer solution was 11.6 g, and this corresponds to a molar ratio (MR) of alkali to the vinyl acetate unit in the polyvinyl acetate, of 0.025. About 3 minutes after the alkali addition, the system gelled and this was ground in a mill and then left as such for 1 hour to promote the saponification of the polymer. Next, 1000 g of methyl acetate was added to it to neutralize the remaining alkali. With a phenolphthalein indicator, the termination of the neutralization was confirmed. Then, a white solid PVA was collected through filtration. 1000 g of methanol was added to the thus-collected PVA and kept at room temperature for 3 hours, with which the polymer PVA was thus washed. The washing operation was repeated three times. Then, this was dewatered through centrifugation, and the resulting PVA was dried in a drier at 70° C. for 2 days to obtain a dry PVA (PVA-33). Thus obtained, the PVA (PVA-33) had a saponification degree of 98 mol %. On the other hand, the methanol solution of polyvinyl acetate that had been obtained by removing the non-reacted vinyl acetate monomer after the polymerization was subjected to saponification with an alkali at an alkali molar ratio of 0.5, then ground and kept at 60° C. for 5 hours to promote the saponification of the polymer. Then, this was subjected to Soxhlet extraction washing with methanol for 3 days and then dried at 80° C. under reduced pressure for 3 days to obtain a purified PVA. The mean degree of polymerization of the PVA was measured in an ordinary manner of JIS K6726, and was 1000. The 1,2-glycol bond content of the pure PVA was obtained through 500 MHz-proton NMR (with JEOL GX-500) in the same manner as above, and it was 2.5 mol %.

PVA Production Example 34

2700 g of vinyl acetate, 300 g of methanol and 0.081 g of tartaric acid were fed into a 5-liter pressure reactor equipped with a stirrer, a nitrogen inlet mouth and an initiator inlet mouth, and, while this was bubbled with nitrogen gas at room temperature, the pressure in the reactor was increased up to 2.0 MPa, left as such for 10 minutes, and then degassed. This operation was repeated three times whereby the reactor was thus purged with nitrogen. An initiator, 2,2'-azobis(N-butyl-2-methylpropionamide) was dissolved in methanol to prepare an initiator solution having a concentration of 0.05 g/liter, which was then bubbled and purged with nitrogen gas. Next, the polymerization reactor was heated to have an inner temperature of 180° C., and the pressure in the reactor in this stage was 1.6 MPa. Next, 0.4 ml of the initiator solution was introduced into the reactor to start the polymerization. During the polymerization, the temperature of the system was kept at 180° C., and the initiator solution of 2,2-azobis(N-butyl-2-methylpropionamide) was continuously added to the system at a rate of 10.6 ml/hr. During the polymerization in that condition, the pressure in the reactor was 1.6 MPa. After 4 hours, this was cooled to terminate the polymerization. In this stage, the solid concentration in the resulting reaction system was 27%. Next, methanol was intermittently added to the system at 30° C. under reduced pressure to remove the residual vinyl acetate monomer. The process thus gave a methanol solution of polyvinyl acetate (concentration, 33%). Methanol was added to the thus-obtained polyvinyl acetate solution to make it have a polymer concentration of 30%. 333 g of the thus-controlled methanol solution of polyvinyl acetate (100 g of polyvinyl acetate in the solution) was subjected to saponification at 40° C. with an alkali solution (methanol solution of 10% NaOH) added thereto. The amount of the alkali solution added to the polymer solution was 11.6 g, and this corresponds to a molar ratio (MR) of alkali to the vinyl acetate unit in the polyvinyl acetate, of 0.025. About 3 minutes after the alkali addition, the system gelled and this was ground in a mill and then left as such for 1 hour to promote the saponification of the polymer. Next, 1000 g of methyl acetate was added to it to neutralize the remaining alkali. With a phenolphthalein indicator, the termination of the neutralization was confirmed. Then, a white solid PVA was collected through filtration. 1000 g of methanol was added to the thus-collected PVA and kept at room temperature for 3 hours, with which the polymer PVA was thus washed. The washing operation was repeated three times. Then, this was dewatered through centrifugation, and the resulting PVA was dried in a drier at 70° C. for 2 days to obtain a dry PVA (PVA-34). Thus obtained, the PVA (PVA-34) had a saponification degree of 98 mol %. On the other hand, the methanol solution of polyvinyl acetate that had been obtained by removing the non-reacted vinyl acetate monomer after the polymerization was subjected to saponification with an alkali at an alkali molar ratio of 0.5, then ground and kept at 60° C. for 5 hours to promote the saponification of the polymer. Then, this was subjected to Soxhlet extraction washing with methanol for 3 days and then dried at 80° C. under reduced pressure for 3 days to obtain a purified PVA. The mean degree of polymerization of the PVA was measured in an ordinary manner of JIS K6726, and was 500. The 1,2-glycol bond content of the pure PVA was obtained through 500 MHz-proton NMR (with JEOL GX-500) in the same manner as above, and it was 2.9 mol %.

PVA Production Example 35

2850 g of vinyl acetate, 150 g of methanol and 0.086 g of tartaric acid were fed into a 5-liter pressure reactor equipped with a stirrer, a nitrogen inlet mouth and an initiator inlet mouth, and, while this was bubbled with nitrogen gas at room temperature, the pressure in the reactor was increased up to 2.0 MPa, left as such for 10 minutes, and then degassed. This operation was repeated three times where by the reactor was thus purged with nitrogen. An initiator, 2,2'-azobis(N-butyl-2-methylpropionamide) was dissolved in methanol to prepare an initiator solution having a concentration of 0.1 g/liter, which was then bubbled and purged with nitrogen gas. Next, the polymerization reactor was heated to have an inner temperature of 150° C., and the pressure in the reactor in this stage was 1.0 MPa. Next, 15.0 ml of the initiator solution was introduced into the reactor to start the polymerization. During the polymerization, the temperature of the system was kept at 150° C., and the initiator solution of 2,2'-azobis(N-butyl-2-methylpropionamide) was continuously added to the system at a rate of 15.8 ml/hr. During the polymerization in that condition, the pressure in the reactor was 1.0 MPa. After 4 hours, this was cooled to terminate the polymerization. In this stage, the solid concentration in the resulting reaction system was 35%. Next, methanol was intermittently added to the system at 30° C. under reduced pressure to remove the residual vinyl acetate monomer. The process thus gave a methanol solution of polyvinyl acetate (concentration, 33%). Methanol was added to the thus-obtained polyvinyl acetate solution to make it have a polymer concentration of 25%. 400 g of the thus-controlled methanol solution of polyvinyl acetate (100 g of polyvinyl acetate in the solution) was subjected to saponificiation at 40° C. with an alkali solution (methanol solution of 10% NaOH) added thereto. The amount of the alkali solution added to the polymer solution was 7 g, and this corresponds to a molar ratio (MR) of alkali to the vinyl acetate unit in the polyvinyl acetate, of 0.015. About 3 minutes after the alkali addition, the system gelled and this was ground in a mill and then left as such for 1 hour to promote the saponification of the polymer. Next, 1000 g of methyl acetate was added to it to neutralize the remaining alkali. With a phenolphthalein indicator, the termination of the neutralization was confirmed. Then, a white solid PVA was collected through filtration. 1000 g of methanol was added to the thus-collected PVA and kept at room temperature for 3 hours, with which the polymer PVA was thus washed. The washing operation was repeated three times. Then, this was dewatered through centrifugation, and the resulting PVA was dried in a drier at 70° C. for 2 days to obtain a dry PVA (PVA-35). Thus obtained, the PVA (PVA-35) had a saponification degree of 88 mol %. On the other hand, the methanol solution of polyvinyl acetate that had been obtained by removing the non-reacted vinyl acetate monomer after the polymerization was subjected saponification with an alkali at an alkali molar ratio of 0.5, then ground and kept at 60° C. for 5 hours to promote the saponification of the polymer. Then, this was subjected to Soxhlet extraction washing with methanol for 3 days and then dried at 80° C. under reduced pressure for 3 days to obtain a purified PVA. The mean degree of polymerization of the PVA was measured in an ordinary manner of JIS K6726, and was 1000. The 1,2-glycol bond content of the pure PVA was obtained through 500 MHz-proton NMR (with JEOL GX-500) in the same manner as above, and it was 2.5 mol %.

Emulsion Production Example 31

80 parts of aqueous 9.5% solution of "PVA217" (by Kuraray, having a degree of polymerization of 1700 and a saponification degree of 88 mol %) was fed into a pressure autoclave equipped with a nitrogen inlet mouth, a thermometer and a stirrer, heated up to 60° C., and then purged with nitrogen. 80 parts of vinyl acetate was fed into it, and then ethylene was into it to an increased pressure of 4.9 MPa. 2 g of aqueous 0.5% hydrogen peroxide solution and 0.3 g of aqueous 2% Rongalite solution were fed into it under pressure, and the polymerization was then started. When the remaining vinyl acetate concentration reached 10%, ethylene was discharged out until the ethylene pressure was lowered to 2.0 MPa. Then, 0.3 g of aqueous 3% hydrogen peroxide solution was introduced into it under pressure to complete the polymerization. During the polymerization, no aggregation was found, and the polymerization stability of the system was good. The process gave ethylene-vinyl acetate copolymer emulsion (Em-31) having a solid concentration of 55% and an ethylene content of 18% by weight.

Emulsion Production Example 32

5 parts of mercapto-terminated PVA (having a degree of polymerization of 550, a saponification degree of 88.3 mol % and a mercapto group content of $3.3 \times 10^{-5}$ equivalent/g) and 90 parts of ion-exchanged water were fed into a glass vessel equipped with a reflux condenser, a dropping funnel, a thermometer, a nitrogen inlet mouth and a stirrer, and completely dissolved at 95° C. Next, its pH was made to be 4 with diluted sulfuric acid added thereto, and then 10 parts of methyl methacrylate, 10 parts of n-butyl acrylate and 0.1 parts of n-dodecylmercaptan were added to it with stirring at 150 rpm. This was purged with nitrogen and heated up to 70° C. 5 parts of 1 potassium persulfate was added to it to start the polymerization. Then, a mixture of 40 parts of methyl methacrylate, 40 parts of n-butyl acrylate and 0.4 parts of n-dodecylmercaptan was continuously added to it, over a period of 2 hours. 3 hours after the start of the polymerization, the conversion reached 99.5%, and the polymerization was stopped in this stage. The process gave stable methyl methacrylate/n-butyl acrylate copolymer emulsion (Em-32) having a solid concentration of 52.0%.

Emulsion Production Example 33

An emulsion (Em-33) was produced in the same manner as in Emulsion Production Example 31, for which, however, PVA-31 that had been produced in PVA Production Example 31 was used in place of "PVA217" in Emulsion Production Example 31.

Example 31

A mixture of 100 parts, in terms of the solid content thereof, of the ethylene-vinyl acetate copolymer emulsion (A) (Em-31) obtained in Emulsion Production Example 31 and 200 parts of aqueous 5% solution of PVA-32 obtained in PVA Production Example 32, and 2%, relative to the solid content of the emulsion, of fine powder of silicic anhydride (having a mean particle size of 2 μm) were separately sprayed into hot air at 120° C. at the same time and dried to obtain an emulsion powder having a mean particle size of 20 μm. The physical properties of the emulsion powder are given in Table 3-1.

Property Evaluation of Emulsion Powder:
The emulsion powder was evaluated in the same manner as in Example 1.
Property Evaluation of Additives for Hydraulic Substances:
Property of Additives for Cement Mortar
Evaluated in the same manner as in Example 1. The results are given in Table 3-2.
Property Evaluation of Joint Materials for Hydraulic Substances:
Property of Joint Material for Cement Mortar:
The additives for hydraulic substances obtained in the above was directly used for joint materials for hydraulic substances, and the samples thus constructed were tested and evaluated in the same manner as in Example 1. The data of the property for joint material are given in Table 3-2.

Comparative Example 31

An emulsion powder was produced in the same manner as in Example 31, for which, however, ordinary PVA (PVA-36 having a degree of polymerization of 500, a saponification degree of 98.5 mol %, and a 1,2-glycol bond content of 1.6 mol %—Kuraray's "PVA105") was used in place of PVA-32 in Example 31. Its data are given in Table 3-1 and Table 3-2.

Example 32

An emulsion powder was produced in the same manner as in Example 31, for which, however, PVA-33 that had been obtained in PVA Production Example 33 was used in place of PVA-32 in Example 31. Its data are given in Table 3-1 and Table 3-2.

Example 33

An emulsion powder was produced in the same manner as in Example 31, for which, however, PVA-34 that had been obtained in PVA Production Example 34 was used in place of PVA-32 in Example 31. Its data are given in Table 3-1 and Table 3-2.

Example 34

An emulsion powder was produced in the same manner as in Example 31, for which, however, PVA-35 that had been obtained in PVA Production Example 35 was used in place of PVA-32 in Example 31. Its data are given in Table 3-1 and Table 3-2.

Comparative Example 32

An emulsion powder was produced in the same manner as in Example 31, for which, however, ordinary PVA (PVA-37 having a degree of polymerization of 1000, a saponification degree of 88 mol %, and a 1,2-glycol bond content of 1.6 mol %—Kuraray's "PVA210") was used in place of PVA-32 in Example 31. Its data are given in Table 3-1 and Table 3-2.

Comparative Example 33

An emulsion powder was produced in the same manner as in Example 31, for which, however, PVA-32 was not used. This was tested and evaluated in the same manner as in Example 31. However, since its redispersibility was extremely bad and its film formability was bad, the emulsion power could not be tested and evaluated for the film dissolution and the stability thereof. The results are given in Table 3-1 and Table 3-2.

Example 35

An emulsion powder was produced in the same manner as in Example 31, for which, however, 100 parts but not 200 parts of the aqueous 5% solution of PVA-32 was used. Its data are given in Table 3-1 and Table 3-2.

Comparative Example 34

An emulsion powder was produced in the same manner as in Comparative Example 31, for which, however, 100 parts but not 200 parts of the aqueous 5% solution of PVA-36 was used. However, since its redispersibility was extremely bad and its film formability was bad, the emulsion power could not be tested and evaluated for the film dissolution and the stability thereof. The results are given in Table 3-1 and Table 3-2.

Example 36

An emulsion powder was produced in the same manner as in Example 31, for which, however, 300 parts but not 200 parts of the aqueous 5% solution of PVA-32 was used. Its data are given in Table 3-1 and Table 3-2.

Example 37

An emulsion powder was produced in the same manner as in Example 31, for which, however, 40 parts but not 200 parts of the aqueous 5% solution of PVA-32 was used. Its data are given in Table 3-1 and Table 3-2.

Example 38

An emulsion powder was produced in the same manner as in Example 31, for which, however, 500 parts but not 200 parts of the aqueous 5% solution of PVA-32 was used. Its data are given in Table 3-1 and Table 3-2.

Example 39

An emulsion powder was produced in the same manner as in Example 31, for which, however, the methyl methacrylate/ n-butyl acrylate copolymer emulsion (A) (Em-32) that had been prepared in Emulsion Production Example 32 was used in place of Em-31 in Example 31. Its data are given in Table 3-1 and Table 3-2.

Comparative Example 35

An emulsion powder was produced in the same manner as in Example 39, for which, however, ordinary PVA (PVA-36) was used in place of PVA-32 in Example 39. Its data are given in Table 3-1 and Table 3-2.

Example 310

An emulsion powder was produced in the same manner as in Example 31, for which, however, Em-33 was used in place of Em-31 in Example 31. Its data are given in Table 3-1 and Table 3-2.

Comparative Example 36

An emulsion powder was produced in the same manner as in Example 31, for which, however, Em-33 was used in place of Em-31 and PVA (B) (PVA-32) was not used. Its data are given in Table 3-1 and Table 3-2.

Comparative Example 37

An emulsion powder was produced in the same manner as in Example 310, for which, however, PVA (B) (PVA-36 having a degree of polymerization of 500, a saponification degree of 98.5 mol % and a 1,2-glycol bond content of 1.6 mol %—Kuraray's "PVA105") was used in place of PVA (B) (PVA-32) in Example 310. Its data are given in Table 3-1 and Table 3-2.

As described in detail hereinabove with reference to its preferred embodiments, the invention provides synthetic resin emulsion powder of good redispersibility and water resistance. The redispersion of the resin emulsion powder of the invention well forms good films, and its storage stability at low temperatures is good.

Using the emulsion powder of the invention realizes good additives to hydraulic substances, which well disperse in hydraulic substances such as cement mortar and which give hardened hydraulic substances of high mechanical strength.

In addition, using the emulsion powder of the invention also realizes joint materials for hydraulic substances, which have good adhesiveness and durability and which give jointed hydraulic substances of high mechanical strength.

TABLE 1

| | Emulsion (A) | PVA (B) | ethylene modification (mol %) | 1,2-glycol content (mol %) | Degree of polymerization | Saponification degree (mol %) | amount (part) | Redispersibility filter residue (%) | condition | Film Formability | Film Dissolution (%) | Gel Content (%) | Storage Stability 0° C. | 20° C. |
|---|---|---|---|---|---|---|---|---|---|---|---|---|---|---|
| Example 1 | Em-1 | PVA-1 | 5 | 1.5 | 500 | 95 | 10 | 0.5 | ◎ | ○ | 2.7 | 25 | ○ | ○ |
| Example 2 | Em-1 | PVA-2 | 10 | 1.5 | 500 | 98 | 10 | 3 | ○ | ○ | 1.1 | 22 | ○ | ○ |
| Example 3 | Em-1 | PVA-3 | 5 | 1.5 | 500 | 88 | 10 | 0.3 | ◎ | ○ | 3.7 | 35 | ○ | ○ |
| Comp. Ex. 1 | Em-1 | PVA-4 | 0 | 1.6 | 500 | 98.5 | 10 | 35 | Δ | Δ | 7.8 | 12 | X | ○ |
| Comp. Ex. 2 | Em-1 | PVA-5 | 0 | 1.6 | 500 | 88 | 10 | 5 | ○ | ○ | 15 | 28 | ○ | ○ |
| Comp. Ex. 3 | Em-1 | no | — | — | — | — | 0 | 80 | X | X | — | — | — | — |
| Example 4 | Em-1 | PVA-6 | 5 | 1.5 | 1300 | 93 | 10 | 2 | ○ | ○ | 1.8 | 30 | ○ | ○ |
| Comp. Ex. 4 | Em-1 | PVA-7 | 0 | 1.6 | 1300 | 95 | 10 | 40 | Δ | Δ | 9 | 17 | Δ | ○ |
| Example 5 | Em-1 | PVA-1 | 5 | 1.5 | 500 | 95 | 5 | 1 | ◎ | ○ | 0.6 | 27 | ○ | ○ |
| Example 6 | Em-1 | PVA-1 | 5 | 1.5 | 500 | 95 | 15 | 0.8 | ◎ | ○ | 4.1 | 21 | ○ | ○ |
| Example 7 | Em-1 | PVA-1 | 5 | 1.5 | 500 | 95 | 2 | 4.3 | ○ | ○ | 1.3 | 28 | ○ | ○ |
| Example 8 | Em-1 | PVA-1 | 5 | 1.5 | 500 | 95 | 25 | 3 | ○ | ○ | 6.3 | 20 | ○ | ○ |
| Example 9 | Em-1 | PVA-8 | 2.5 | 1.6 | 500 | 88 | 10 | 0.7 | ◎ | ○ | 3.8 | 30 | ○ | ○ |
| Example 10 | Em-1 | PVA-9 | 1.5 | 1.6 | 500 | 88 | 10 | 3.4 | ○ | ○ | 6.7 | 25 | ○ | ○ |
| Comp. Ex. 5 | Em-1 | PVA-10 | 0.5 | 1.6 | 500 | 95 | 10 | 4.7 | ○ | ○ | 8.2 | 17 | Δ | ○ |
| Comp. Ex. 6 | Em-1 | PVA-11 | 25 | 1.1 | 500 | 95 | 10 | 50 | X | X | — | — | X | X |
| Example 11 | Em-1 | PVA-12 | 3 | 1.9 | 1300 | 93 | 10 | 0.8 | ◎ | ○ | 1.3 | 35 | ○ | ○ |
| Example 12 | Em-1 | PVA-13 | 5 | 2.2 | 500 | 88 | 10 | 0.1 | ◎ | ○ | 3.5 | 40 | ○ | ○ |
| Example 13 | Em-2 | PVA-1 | 5 | 1.5 | 500 | 95 | 10 | 1.4 | ◎ | ○ | 2.5 | 24 | ○ | ○ |
| Comp. Ex. 7 | Em-2 | PVA-5 | 0 | 1.6 | 500 | 88 | 10 | 6 | ○ | ○ | 18 | 27 | ○ | ○ |
| Comp. Ex. 8 | Em-3 | PVA-4 | 0 | 1.6 | 500 | 98.5 | 10 | 5.7 | ○ | ○ | 7.3 | 11 | Δ | ○ |
| Comp. Ex. 9 | Em-1 | PVA-14 | 15 | 1.3 | 1300 | 93 | 10 | 52 | X | X | — | — | X | X |
| Comp. Ex. 10 | Em-1 | PVA-15 | propylene 5 | 1.5 | 1300 | 98 | 10 | 13 | Δ | Δ | 14 | 15 | ○ | ○ |
| Example 14 | Em-4 | PVA-1 | 5 | 1.5 | 500 | 95 | 10 | 0.3 | ◎ | ○ | 2.4 | 43 | ○ | ○ |

TABLE 2

| | Physical Properties of Mortar | | | Physical Properties of Joint Material Adhesion Strength | | |
|---|---|---|---|---|---|---|
| | slump (mm) | bending strength (kg/cm$^2$) | compression strength (kg/cm$^2$) | standard condition (kg/cm$^2$) | after heat cycle (kg/cm$^2$) | after frozen and thawed (kg/cm$^2$) |
| Example 1 | 34 | 76 | 177 | 20 | 15 | 13 |
| Example 2 | 28 | 70 | 169 | 19 | 15 | 13 |
| Example 3 | 38 | 80 | 179 | 20 | 15 | 13 |
| Comp. Ex. 1 | 15 | 50 | 145 | 13 | 10 | 7 |
| Comp. Ex. 2 | 20 | 55 | 150 | 15 | 11 | 7 |
| Comp. Ex. 3 | 10 | 40 | 120 | — | — | — |
| Example 4 | 31 | 71 | 173 | 18 | 14 | 12 |
| Comp. Ex. 4 | 14 | 54 | 143 | 13 | 10 | 7 |
| Example 5 | 33 | 74 | 176 | 20 | 15 | 12 |
| Example 6 | 35 | 77 | 179 | 20 | 15 | 13 |
| Example 7 | 27 | 70 | 168 | 18 | 13 | 11 |
| Example 8 | 28 | 71 | 169 | 19 | 14 | 11 |
| Example 9 | 33 | 75 | 174 | 21 | 16 | 14 |
| Example 10 | 28 | 69 | 165 | 19 | 15 | 13 |
| Comp. Ex. 5 | 25 | 65 | 160 | 16 | 11 | 8 |
| Comp. Ex. 6 | — | — | — | — | — | — |
| Example 11 | 35 | 78 | 179 | 20 | 14 | 12 |
| Example 12 | 38 | 80 | 181 | 21 | 16 | 14 |
| Example 13 | 37 | 75 | 174 | 19 | 15 | 13 |
| Comp. Ex. 7 | 22 | 56 | 157 | 15 | 10 | 7 |
| Comp. Ex. 8 | 32 | 60 | 161 | 14 | 9 | 6 |
| Comp. Ex. 9 | — | — | — | — | — | — |
| Comp. Ex. 10 | 18 | 53 | 146 | 12 | 10 | 7 |
| Example 14 | 40 | 82 | 185 | 22 | 18 | 15 |

TABLE 2-1

| | | Emulsion (A) | | | | | | Redispersibility | | film | | | Physical Properties of Mortar | |
|---|---|---|---|---|---|---|---|---|---|---|---|---|---|---|
| | | ethylene modification PVA | 1,2-glycol content (mol %) | degree of polymerization | Saponification degree (mol %) | PVA (B) | amount (part) | filter residue (%) | condition | film form-ability | dissolution (%) | Gel content (%) | slump (mm) | bending strength (kg/cm²) | compression strength (kg/cm²) |
| Example 21 | Em-21 PVA-21 | 4 | 1.5 | 1300 | 93 | — | — | 1.1 | ○ | ○ | 4.5 | 55 | 35 | 75 | 179 |
| Example 22 | Em-22 PVA-22 | 3 | 1.5 | 500 | 95 | — | — | 0.8 | ◎ | ○ | 4 | 50 | 38 | 82 | 181 |
| Example 23 | Em-23 PVA-23 | 5 | 1.5 | 1300 | 98 | — | — | 2.8 | ○ | ○ | 3.8 | 45 | 33 | 70 | 175 |
| Comp. Ex. 21 | Em-24 PVA-24 | 0 | 1.6 | 1300 | 93 | — | — | 30 | Δ | Δ | 7 | 25 | 20 | 55 | 160 |
| Comp. Ex. 22 | Em-25 PVA-25 | 0 | 1.6 | 500 | 88 | — | — | 8 | ○ | ○ | 15 | 33 | 26 | 60 | 165 |
| Comp. Ex. 23 | Em-26 PVA-26 | 0 | 1.6 | 1000 | 98.5 | — | — | 76 | X | X | — | — | — | — | — |
| Example 24 | Em-27 PVA-27 | 3 | 1.9 | 1300 | 93 | — | — | 0.6 | ◎ | ○ | 4.4 | 55 | 37 | 80 | 182 |
| Example 25 | Em-28 PVA-28 | 5 | 2.2 | 500 | 93 | — | — | 0.6 | ◎ | ○ | 3.9 | 52 | 36 | 82 | 180 |
| Example 26 | Em-29 PVA-29 | 2.5 | 1.6 | 500 | 88 | — | — | 1.3 | ◎ | ○ | 6 | 54 | 36 | 78 | 177 |
| Example 27 | Em-210 PVA-210 | 1.5 | 1.6 | 500 | 88 | — | — | 2.9 | ○ | ○ | 8 | 45 | 33 | 70 | 170 |
| Comp. Ex. 24 | Em-211 PVA-211 | 0.5 | 1.6 | 500 | 95 | — | — | 5.1 | Δ | ○ | 12 | 35 | 24 | 57 | 158 |
| Example 28 | Em-21 PVA-21 | 4 | 1.5 | 1300 | 93 | PVA-22 | 10 | 0.5 | ◎ | ○ | 6.7 | 46 | 36 | 80 | 225 |
| Example 29 | Em-21 PVA-21 | 4 | 1.5 | 1300 | 93 | PVA-22 | 2 | 2.7 | ○ | ○ | 5.3 | 51 | 30 | 70 | 218 |
| Example 210 | Em-21 PVA-21 | 4 | 1.5 | 1300 | 93 | PVA-22 | 25 | 2.5 | ○ | ○ | 7.8 | 40 | 31 | 72 | 220 |
| Example 211 | Em-212 PVA-21 | 4 | 1.5 | 1300 | 93 | — | — | 0.8 | ◎ | ○ | 4.7 | 53 | 35 | 79 | 180 |
| Comp. Ex. 25 | Em-213 PVA-25 | 0 | 1.6 | 500 | 88 | — | — | 10 | Δ | ○ | 16 | 35 | 28 | 67 | 166 |
| Example 212 | Em-212 PVA-21 | 4 | 1.5 | 1300 | 93 | PVA-22 | 10 | 0.6 | ◎ | ○ | 6.4 | 44 | 36 | 80 | 233 |
| Comp. Ex. 26 | Em-214 PVA-213 | 0.5 | 1.6 | 550 | 88.3 | — | — | 6 | ○ | ○ | 14 | 30 | 29 | 61 | 160 |
| Comp. Ex. 27 | Em-215 PVA-214 | 0 | 1.9 | 1300 | 93 | — | — | 5.5 | ○ | ○ | 13 | 24 | 28 | 60 | 163 |

TABLE 3-1

| | Emulsion (A) | PVA (B) | 1,2-glycol content (mol %) | degree of polymerization | saponification degree (mol %) | amount C part | Redispersibility filter residue | condition | Film Form-ability | Film Dissolution (%) | Gel Content (%) | Storage Stability 0° C. |
|---|---|---|---|---|---|---|---|---|---|---|---|---|
| Example 31 | Em-31 | PVA-32 | 2.2 | 500 | 98 | 10 | 0.1 | ◎ | ○ | 4.7 | 25 | ○ |
| Comp. Ex. 31 | Em-31 | PVA-36 | 1.6 | 500 | 98.5 | 10 | 35 | Δ | Δ | 7.8 | 12 | X |
| Example 32 | Em-31 | PVA-33 | 2.5 | 1000 | 98 | 10 | 0.2 | ◎ | ○ | 4.4 | 27 | ○ |
| Example 33 | Em-31 | PVA-34 | 2.9 | 500 | 98 | 10 | 0.1 | ◎ | ○ | 4.9 | 28 | ○ |
| Example 34 | Em-31 | PVA-35 | 2.5 | 1000 | 88 | 10 | 0.1 | ◎ | ○ | 5.3 | 38 | ○ |
| Comp. Ex. 32 | Em-31 | PVA-37 | 1.6 | 1000 | 88 | 10 | 6 | ○ | ○ | 12 | 28 | ○ |
| Comp. Ex. 33 | Em-31 | no | — | — | — | 0 | 80 | X | X | — | — | — |
| Example 35 | Em-31 | PVA-32 | 2.2 | 500 | 98 | 5 | 0.2 | ◎ | ○ | 2.4 | 29 | ○ |
| Comp. Ex. 34 | Em-31 | PVA-36 | 1.6 | 500 | 98.5 | 5 | 60 | X | X | — | — | — |
| Example 36 | Em-31 | PVA-32 | 2.2 | 500 | 98 | 15 | 0.1 | ◎ | ○ | 6.2 | 22 | ○ |
| Example 37 | Em-31 | PVA-32 | 2.2 | 500 | 98 | 2 | 0.5 | ○ | ○ | 1.3 | 31 | ○ |
| Example 38 | Em-31 | PVA-32 | 2.2 | 500 | 98 | 25 | 0.1 | ◎ | ○ | 6.5 | 20 | ○ |
| Example 39 | Em-32 | PVA-32 | 2.2 | 500 | 98 | 10 | 0.2 | ◎ | ○ | 4.2 | 25 | ○ |
| Comp. Ex. 35 | Em-32 | PVA-36 | 1.6 | 500 | 98.5 | 10 | 30 | Δ | Δ | 7.4 | 11 | ○ |
| Example 310 | Em-33 | PVA-32 | 2.2 | 500 | 98 | 10 | 0.1 | ◎ | ○ | 3.5 | 26 | ○ |
| Comp. Ex. 36 | Em-33 | no | — | — | — | 0 | 1.3 | ○ | ○ | 2.5 | 18 | ○ |
| Comp. Ex. 37 | Em-33 | PVA-36 | 1.6 | 500 | 98.5 | 5 | 4.5 | Δ | Δ | 7.5 | 17 | x |

TABLE 3-2

| | Physical Properties of Mortar | | | Physical Properties of Joint Material |
|---|---|---|---|---|
| | Slump (mm) | bending strength (kg/cm$^2$) | compression strength (kg/cm$^2$) | standard condition (kg/cm$^2$) |
| Example 31 | 36 | 77 | 180 | 21 |
| Comp. Ex. 31 | 15 | 50 | 145 | 13 |
| Example 32 | 33 | 73 | 170 | 19 |
| Example 33 | 37 | 78 | 182 | 23 |
| Example 34 | 35 | 75 | 175 | 20 |
| Comp. Ex. 32 | 29 | 65 | 161 | 15 |
| Comp. Ex. 33 | — | — | — | — |
| Example 35 | 34 | 75 | 175 | 19 |
| Comp. Ex. 34 | — | — | — | — |
| Example 36 | 38 | 77 | 182 | 22 |
| Example 37 | 31 | 69 | 167 | 17 |
| Example 38 | 37 | 70 | 172 | 19 |
| Example 39 | 36 | 76 | 178 | 20 |
| Comp. Ex. 35 | 14 | 45 | 140 | 12 |
| Example 310 | 38 | 79 | 183 | 23 |
| Comp. Ex. 36 | 30 | 68 | 165 | 17 |
| Comp. Ex. 37 | 15 | 48 | 143 | 12 |

What is claimed is:

1. A synthetic resin emulsion powder, obtained by:
   (i) forming a polymer emulsion (A) comprising a dispersant and a dispersoid,
   (ii) mixing the polymer emulsion (A) with a polyvinyl alcohol (B) to form an emulsion composition, and
   (iii) drying the emulsion composition,
   wherein the dispersoid is a polymer having one or more unsaturated monomer units selected from the group consisting of ethylenic unsaturated monomers and dienic monomers, and
   wherein the polyvinyl alcohol (B) has an ethylene unit content of from 1 to 12 mol %.

2. The synthetic resin emulsion powder as claimed in claim 1, wherein the polyvinyl alcohol (B) is a random copolymer comprising polymerized units of vinyl acetate and ethylene, obtained by polymerizing a mixture of ethylenically unsaturated compounds all of which are ethylenically unsaturated monomers and saponifying the resultant polymer.

3. The synthetic resin emulsion powder as claimed in claim 1, wherein the polyvinyl alcohol (B) is a saponified random copolymer consisting of polymerized units of vinyl acetate and ethylene.

4. The synthetic resin emulsion powder as claimed in claim 1, wherein the polyvinyl alcohol (B) is not chemically bonded with the dispersoid.

5. The synthetic resin emulsion powder as claimed in claim 1, wherein the ethylene unit content of the polyvinyl alcohol (B) is from 2 to 12 mol %.

6. The synthetic resin emulsion powder as claimed in claim 1, wherein the ethylene unit content of the polyvinyl alcohol (B) is from 5 to 10 mol %.

7. The synthetic resin emulsion powder as claimed in claim 1, wherein the ethylene unit content of the polyvinyl alcohol (B) is from 1.5 to 5 mol %.

8. The synthetic resin emulsion powder as claimed in claim 1, comprising from 1 to 50 parts by weight of the polyvinyl alcohol (B) relative to 100 parts by weight of the dispersoid.

9. The synthetic resin emulsion powder as claimed in claim 1, wherein the dispersoid is at least one of a polyvinyl ester and an olefin-vinyl ester copolymer.

10. The synthetic resin emulsion powder as claimed in claim 1, wherein the polyvinyl alcohol (B) has from (1.7-X/40) to 4 mol % of 1,2-glycol bonds in which X (mol %) indicates the ethylene unit content of the polymer.

11. The synthetic resin emulsion powder as claimed in claim 1, further comprising: an inorganic powder.

12. The synthetic resin emulsion powder as claimed in claim 1, for which the drying is spray-drying.

13. An additive or joint material for hydraulic substances, comprising: the synthetic resin powder of claim 1.

14. The synthetic resin emulsion powder as claimed in claim 1, wherein the polyvinyl alcohol (B) is different from the dispersant.

15. The synthetic resin emulsion powder as claimed in claim 1, wherein the dispersant is a polyvinyl alcohol.

16. The synthetic resin emulsion powder as claimed in claim 1, wherein the dispersant is a polyvinyl alcohol different from the polyvinyl alcohol (B).

17. The synthetic resin emulsion powder as claimed in claim 1, wherein the dispersant is a polyvinyl alcohol having a 1,2-glycol bond content of at least 1.9 mol %.

18. A synthetic resin emulsion powder, obtained by:
   (i) forming a polymer emulsion (A) comprising a dispersant and a dispersoid,
   (ii) mixing the polymer emulsion (A) with a polyvinyl alcohol (D) to form an emulsion composition,
   (iii) drying the emulsion composition,
   wherein the dispersoid is a polymer having one or more unsaturated monomer units selected from the group consisting of ethylenic unsaturated monomers and dienic monomers, and
   wherein the polyvinyl alcohol (D) has a 1,2-glycol bond content of at least 1.9 mol %.

19. The synthetic resin emulsion powder as claimed in claim 18, wherein the polyvinyl alcohol (D) is not chemically bonded with the dispersoid.

20. The synthetic resin emulsion powder as claimed in claim 18, comprising from 1 to 50 parts by weight of the polyvinyl alcohol (D) relative to 100 parts by weight of the dispersoid.

21. The synthetic resin emulsion powder as claimed in claim 18, wherein the dispersoid is at least one of a polyvinyl ester and an olefin-vinyl ester copolymer.

22. The synthetic resin emulsion powder as claimed in claim 18, further comprising: an inorganic powder.

23. The synthetic resin emulsion powder as claimed in claim 18, for which the drying is spray-drying.

24. An additive or joint material for hydraulic substances, comprising: the synthetic resin powder of claim 18.

25. The synthetic resin emulsion powder as claimed in claim 18, wherein the polyvinyl alcohol (D) is different from the dispersant.

26. A synthetic resin emulsion powder, obtained by:
   (i) forming a polymer emulsion (A) comprising a dispersant and a dispersoid, and
   (ii) drying the polymer emulsion,
   wherein the dispersoid is a polymer having one or more unsaturated monomer units selected from the group consisting of ethylenic unsaturated monomers and dienic monomers, and
   wherein the dispersant has an ethylene unit content of from 1 to 12 mol %.

27. The synthetic resin emulsion powder as claimed in claim 26, wherein the dispersant is a random copolymer comprising polymerized units of vinyl acetate and ethylene, obtained by polymerizing a mixture of ethylenically unsaturated monomers all of which are ethylenically unsaturated monomers and saponifying the resultant polymer.

28. The synthetic resin emulsion powder as claimed in claim 26, wherein the dispersant is a saponified random copolymer consisting of polymerized units of vinyl acetate and ethylene.

29. The synthetic resin emulsion powder as claimed in claim 26, wherein the dispersant is not chemically bonded with the dispersoid.

30. The synthetic resin emulsion powder as claimed in claim 26, wherein the ethylene unit content of the dispersant is from 2 to 12 mol %.

31. The synthetic resin emulsion powder as claimed in claim 26, wherein the ethylene unit content of the dispersant is from 5 to 10 mol %.

32. The synthetic resin emulsion powder as claimed in claim 26, wherein the ethylene unit content of the dispersant is from 1.5 to 5 mol %.

33. The synthetic resin emulsion powder as claimed in claim 26, comprising from 1 to 50 parts by weight of the dispersant relative to 100 parts by weight of the dispersoid.

34. The synthetic resin emulsion powder as claimed in claim 26, wherein the dispersoid is at least one of a polyvinyl ester and an olefin-vinyl ester copolymer.

35. The synthetic resin emulsion powder as claimed in claim 26, wherein the dispersant has from (1.7-X/40) to 4 mol % of 1,2-glycol bonds in which X (mol %) indicates the ethylene unit content of the polymer.

36. The synthetic resin emulsion powder as claimed in claim 26, further comprising: an inorganic powder.

37. The synthetic resin emulsion powder as claimed in claim 26, for which the drying is spray-drying.

38. An additive or joint material for hydraulic substances, comprising: the synthetic resin powder of claim 26.

39. The synthetic resin emulsion powder as claimed in claim 26, wherein the polyvinyl alcohol (B) is different from the dispersant.

40. The synthetic resin emulsion powder as claimed in claim 26, wherein the polyvinyl alcohol (B) has an ethylene content of from 1 to 12 mol %.

41. The synthetic resin emulsion powder as claimed in claim 26, wherein the dispersant is a polyvinyl alcohol which has an ethylene unit content of from 1 to 12 mol %.

42. The synthetic resin emulsion powder as claimed in claim 26, wherein the dispersant is a polyvinyl alcohol which has a 1,2-glycol bond content of at least 1.9 mol %.

43. The synthetic resin emulsion powder as claimed in claim 18, wherein the dispersant is a polyvinyl alcohol.

44. The synthetic resin emulsion powder as claimed in claim 18, wherein the dispersant is a polyvinyl alcohol which has a 1,2-glycol bond content of at least 1.9 mol %.

* * * * *